United States Patent
Eng et al.

(10) Patent No.: US 12,170,908 B2
(45) Date of Patent: Dec. 17, 2024

(54) DETECTING INTERFERENCE IN A WIRELESS NETWORK

(71) Applicant: Telefonaktiebolaget LM Ericsson (publ), Stockholm (SE)

(72) Inventors: Chin Lam Eng, Tokyo (JP); Philipp Frank, Madrid (ES); Raul Martin Cuerdo, Madrid (ES); Mitchell Ho, Sydney (AU); Chee Wai Ng, Sydney (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 599 days.

(21) Appl. No.: 17/430,207

(22) PCT Filed: Feb. 15, 2019

(86) PCT No.: PCT/EP2019/053856
§ 371 (c)(1),
(2) Date: Aug. 11, 2021

(87) PCT Pub. No.: WO2020/164739
PCT Pub. Date: Aug. 20, 2020

(65) Prior Publication Data
US 2022/0167183 A1    May 26, 2022

(51) Int. Cl.
*H04W 24/02*    (2009.01)
*G06N 3/045*    (2023.01)
(Continued)

(52) U.S. Cl.
CPC ............ *H04W 24/02* (2013.01); *G06N 3/045* (2023.01); *G06N 3/08* (2013.01); *H04W 24/10* (2013.01)

(58) Field of Classification Search
CPC ...... H04W 24/02; H04W 24/10; G06N 3/045; G06N 3/08
See application file for complete search history.

(56) References Cited

U.S. PATENT DOCUMENTS 9,609,585 B1 * 3/2017 Markovic ............. H04W 48/20
2014/0113644 A1    4/2014 Burchardt et al.
(Continued)

FOREIGN PATENT DOCUMENTS

WO    2016026509 A1    2/2016

OTHER PUBLICATIONS

International Search Report and the Written Opinion of the International Searching Authority, issued in corresponding International Application No. PCT/EP2019/053856, dated Oct. 25, 2019, 22 pages.
(Continued)

*Primary Examiner* — Qun Shen
(74) *Attorney, Agent, or Firm* — Rothwell, Figg, Ernst & Manbeck, P.C.

(57) ABSTRACT

A method 300 is disclosed for generating and training a model to detect interference conditions at a cell in a wireless cellular network and to classify the impact of detected interference conditions on performance of the wireless cellular network in the cell. The method comprises, for each of a plurality of cells in the wireless cellular network (360), obtaining data representing received signal power at a base station serving the cell over a period of time (310) and obtaining data representing a plurality of performance metrics for the cell over the time period (330). The method further comprises obtaining classifications of the received signal power data into one of a plurality of cell interference conditions (320) and the performance metric data into one of a plurality of cell impact classes (340). The method further comprises applying a Multi-Task Learning Machine Learning algorithm to a training data set comprising the classified received signal power and performance metric data to generate a model for classifying received signal power data into one of the plurality of cell interference conditions and for (Continued)

classifying performance metric data into one of the plurality of cell impact classes (350).

16 Claims, 21 Drawing Sheets

(51) Int. Cl.
*G06N 3/08* (2023.01)
*H04W 24/10* (2009.01)

(56) References Cited

U.S. PATENT DOCUMENTS

| | | | |
|---|---|---|---|
| 2014/0280316 A1* | 9/2014 | Ganick | G06F 16/2457 707/769 |
| 2015/0289149 A1 | 10/2015 | Ouyang et al. | |
| 2015/0333986 A1* | 11/2015 | Pang | H04L 43/062 370/252 |
| 2019/0068512 A1* | 2/2019 | Papaloukopoulos | H04L 41/145 |
| 2019/0090769 A1* | 3/2019 | Boleyn | A61B 5/361 |
| 2019/0372644 A1* | 12/2019 | Chen | H04W 88/12 |
| 2020/0029240 A1* | 1/2020 | Li | H04L 43/08 |
| 2020/0053591 A1* | 2/2020 | Prasad | H04W 28/0268 |

OTHER PUBLICATIONS

Anand Padmanabha Iyer et al, "Fast and Accurate Performance Analysis of LTE Radio Access Networks", arxiv.org, Cornell University Library, 201 Olin Library Cornell University Ithaca, NY 14853, May 16, 2016 (May 16, 2016), XP080701297, 15 pages.
Biljana Bojovic et al, "Machine learning-based dynamic frequency and bandwidth allocation in self-organized LTE dense small cell deployments", Eurasip Journal on Wireless Communications and Networking, Biomed Central Ltd, London, UK, vol. 2016, No. 1, Aug. 8, 2016 (Aug. 8, 2016), pp. 1-16, XP021268260.
Yang et al. "A Novel Multi-task Deep Learning Model for Skin Lesion Segmentation and Classification" 2017, 4 pages.
Ruder "An Overview of Multi-Task Learning in Deep Neural Networks*" 2017, 14 pages.
Liu et al. "Representation Learning Using Multi-Task Deep Neural Networks for Semantic Classification and Information Retrieval" 2015, 10 pages.

* cited by examiner

DETECTING INTERFERENCE IN A WIRELESS NETWORK

CROSS REFERENCE TO RELATED APPLICATION(S)

This application is a 35 U.S.C. § 371 National Phase Entry Application from PCT/EP2019/053856, filed Feb. 15, 2019, designating the United States, the disclosure of which is incorporated herein by reference in its entirety.

TECHNICAL FIELD

The present disclosure relates to a method for generating and training a model to detect interference conditions at a cell in a wireless cellular network and to classify the impact of detected interference conditions on performance of the wireless cellular network in the cell. The interference may be uplink interference. The present disclosure also relates to a method for detecting interference conditions at a cell in a wireless cellular network and classifying the impact of detected interference conditions on performance of the wireless cellular network in the cell. The present disclosure also relates to a controller and to a computer program and a computer program product configured, when run on a computer to carry out methods for generating and training a model and for detecting interference conditions and classifying their impact.

BACKGROUND

Consistent service for end-users of a wireless network, such as a Long Term Evolution (LTE) or $5^{th}$ Generation (5G) network, depends on assuring consistent high performance of the network. It is therefore desirable to resolve any unexpected issue which may occur within the network as quickly as possible, so ensuring compliance with end-user Service Level Agreements. One of the issues frequently encountered in network operations is that a base station suffers from anomalous interference, causing degradation of network service and/or interruption to service availability. The base station may be a NodeB, eNodeB, gNodeB, etc. Interference may be caused by transmissions from other elements within the wireless network, for example owing to faulty radio equipment, time varying peak traffic etc., or by transmissions that are external to the network, and may or may not be using correctly licensed spectrum bands.

Current approaches to identify symptoms and performance impact of unexpected interference are based on analysing specific measurement indicators. This is followed by performance troubleshooting in order to narrow down manually the network symptoms that may be caused by the unexpected interference. Multiple rule based mechanisms may be used to detect anomalous interference events and allow for subsequent manual performance impact analysis. However, the lead time from detecting an interference issue to resolution of the issue is typically of the order of several days. In addition, current approaches are typically only able to identify a limited number of previously identified interference patterns, and are then dependent upon expert knowledge for the subsequent performance impact analysis. These limitations may lead to certain anomalous events going unidentified, and cause significant issues with consistency, scaling and cost.

SUMMARY

It is an aim of the present disclosure to provide a method, apparatus and computer readable medium which at least partially address one or more of the challenges discussed above.

According to a first aspect of the present disclosure, there is provided a method for generating and training a model to detect interference conditions at a cell in a wireless cellular network and to classify the impact of detected interference conditions on performance of the wireless cellular network in the cell. The method comprises, for each of a plurality of cells in the wireless cellular network, obtaining data representing received signal power at a base station serving the cell over a period of time and obtaining a classification of the received signal power data into one of a plurality of cell interference conditions. The method further comprises, for each of the plurality of cells in the wireless network, obtaining data representing a plurality of performance metrics for the cell over the time period and obtaining a classification of the performance metric data into one of a plurality of cell impact classes. The method further comprises applying a Multi-Task Learning, MTL, Machine Learning, ML, algorithm to a training data set comprising the classified received signal power and performance metric data to generate a model for classifying received signal power data into one of the plurality of cell interference conditions and for classifying performance metric data into one of the plurality of cell impact classes.

According to examples of the present disclosure, obtaining data representing received signal power and obtaining data representing a plurality of performance metrics over a time period may comprise obtaining time series data representing the received signal power and obtaining time series data representing plurality of performance metrics. According to examples of the present disclosure, the method may further comprise, for each of a plurality of cells in the wireless cellular network, converting the received signal power time series data into a received signal power image data set, and converting the performance metric time series data into a performance metric image data set.

According to examples of the present disclosure, obtaining a classification of the received signal power data into one of a plurality of cell interference conditions may comprise obtaining a classification of individual images of the received signal power image data set into one of the plurality of cell interference conditions, and obtaining a classification of the performance metric data into one of a plurality of cell impact classes may comprise obtaining a classification of individual images of the performance metric image data set into one of the plurality of cell impact classes.

According to examples of the present disclosure, the plurality of interference conditions and cell impact classes may be predefined.

According to examples of the present disclosure, applying an MTL ML algorithm to a training data set comprising the classified received signal power and performance metric data may comprise applying the MTL Machine Learning algorithm to generate a model for classifying received signal power data into one of the plurality of cell interference conditions as a primary task and for classifying performance metric data into one of the plurality of cell impact classes as an auxiliary task.

According to examples of the present disclosure, applying an MTL ML algorithm to a training data set comprising the classified received signal power and performance metric data may comprise learning in parallel a feature representation for each task from the set of tasks comprising classifying received signal power data into one of the plurality of cell interference conditions and classifying performance metric data into one of the plurality of cell impact classes, combining the feature representations learnt for each of the tasks, and jointly learning a shared feature representation for both tasks and parameters for the shared model to perform both tasks.

According to examples of the present disclosure, combining the feature representations learnt for each of the tasks may comprise concatenating the feature representations learnt for each of the tasks.

According to examples of the present disclosure, the feature representations may comprise feature maps generated by passing different filters over the individual images of the image data sets. Learning feature representations may comprise learning the filters to use to generate the feature maps.

According to examples of the present disclosure, jointly learning a shared feature representation for both tasks and parameters for the shared model to perform both tasks may comprise optimising a loss function for the tasks.

According to examples of the present disclosure, images in the received signal power image data set may comprise a first dimension representative of time and a second dimension representative of uplink received power of individual Physical Resource Blocks, PRBs, and each image pixel may represent a value of received signal power for a particular PRB at a particular time instant.

According to examples of the present disclosure, images in the performance metric image data set may comprise a first dimension representative of time and a second dimension representative of performance metric, and each image pixel may represent a value for a particular performance metric at a particular time instant.

According to examples of the present disclosure, converting the received signal power time series data and performance metric time series data into received signal power and performance metric image data sets may comprise partitioning the time period into a plurality of time windows, and converting time series data for each time window into an individual data image.

According to examples of the present disclosure, the same partitioning into time windows may be applied to all of the cells for which data is obtained and converted.

According to examples of the present disclosure, converting the performance metric time series data into an image data set may comprise normalising the performance metric time series data between maximum and minimum values.

According to examples of the present disclosure, converting the received signal power time series data into an image data set may comprise transforming the data to a standardised 2 dimensional array.

According to examples of the present disclosure, the number of PRBs may vary across cells depending upon the bandwidth allocation for different carriers. Transforming the data to a standardised array may therefore comprise ensuring that each axis of each array ranges between the same maximum and minimum values. According to such examples of the present disclosure, transforming the data to a standardised array may ensure comparability between image data sets.

According to examples of the present disclosure, obtaining a classification of the received signal power data into one of a plurality of cell interference conditions and obtaining a classification of the performance metric data into one of a plurality of cell impact classes may comprise at least one of obtaining a classification performed by a human expert, and/or classifying the received signal power data into one of a plurality of cell interference conditions and the performance metric data into one of a plurality of cell impact classes using an ML model.

According to examples of the present disclosure, the ML model may be a neural network, for example comprising one or more autoencoders for feature extraction, which features may be input to a clustering algorithm.

According to another aspect of the present disclosure, there is provided a method for detecting interference conditions at a cell in a wireless cellular network and classifying the impact of detected interference conditions on performance of the wireless cellular network in the cell. The method comprises obtaining data representing received signal power at a base station serving the cell of the over a period of time, obtaining data representing a plurality of performance metrics for the cell over the time period, and applying a Machine Learned model to the obtained data to classify the received signal power data into one of a plurality of cell interference conditions and to classify the performance metric data into one of a plurality of cell impact classes.

According to examples of the present disclosure, the Machine Learned model may comprises a model trained using a method according to any one of the preceding aspects or examples of the present disclosure.

According to examples of the present disclosure, obtaining data representing received signal power and obtaining data representing a plurality of performance metrics over a time period may comprise obtaining time series data representing the received signal power and obtaining time series data representing the plurality of performance metrics.

According to examples of the present disclosure, the method may further comprise converting the received signal power time series data into a received signal power image data set, and converting the performance metric time series data into a performance metric image data set.

According to examples of the present disclosure, applying a Machine Learned model to the obtained data to classify the received signal power data into one of a plurality of cell interference conditions and to classify the performance metric data into one of a plurality of cell impact classes may comprise applying the Machine Learned model to the received signal power image data set and to the performance metric image data set to classify images of the received signal power image data set into one of the plurality of cell interference conditions and to classify images of the performance metric image data set into one of the plurality of cell impact classes.

According to examples of the present disclosure, the plurality of interference conditions and cell impact classes may be predefined.

According to examples of the present disclosure, images in the received signal power image data set may comprise a first dimension representative of time and a second dimension representative of uplink received power of individual Physical Resource Blocks, PRBs, and each image pixel may represent a value of received signal power for a particular PRB at a particular time instant.

According to examples of the present disclosure, images in the performance metric image data set may comprise a first dimension representative of time and a second dimension representative of performance metric, and each image pixel may represent a value for a particular performance metric at a particular time instant.

According to examples of the present disclosure, converting the received signal power time series data and performance metric time series data into received signal power and performance metric image data sets may comprise partitioning the time period into a plurality of time windows, and converting time series data for each time window into an individual data image.

According to examples of the present disclosure, the same partitioning into time windows may be applied to all of the cells for which data is obtained and converted.

According to examples of the present disclosure, converting the performance metric time series data into an image data set may comprise normalising the performance metric time series data between maximum and minimum values.

According to examples of the present disclosure, converting the received signal power time series data into an image data set may comprise transforming the data to a standardised 2 dimensional array.

According to examples of the present disclosure, the number of PRBs may vary across cells depending upon the bandwidth allocation for different carriers. According to such examples of the present disclosure, transforming the data to a standardised array may ensure comparability between image data sets.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided an apparatus for generating and training a model to detect interference conditions at a cell in a wireless cellular network and to classify the impact of detected interference conditions on performance of the wireless cellular network in the cell. The apparatus comprises a processor and a memory, the memory containing instructions executable by the processor such that the apparatus is operable to, for each of a plurality of cells in the wireless cellular network, obtain data representing received signal power at a base station serving the cell over a period of time and obtain a classification of the received signal power data into one of a plurality of cell interference conditions. The apparatus is further operable to, for each of the plurality of cells in the wireless network, obtain data representing a plurality of performance metrics for the cell over the time period and obtain a classification of the performance metric data into one of a plurality of cell impact classes. The apparatus is further operable to apply a Multi-Task Learning, MTL, Machine Learning, ML, algorithm to a training data set comprising the classified received signal power and performance metric data to generate a model for classifying received signal power data into one of the plurality of cell interference conditions and for classifying performance metric data into one of the plurality of cell impact classes.

According to examples of the present disclosure, the apparatus may be further operable to carry out a method according to any one of the preceding aspects or examples of the present disclosure.

According to another aspect of the present disclosure, there is provided an apparatus for detecting interference conditions at a cell in a wireless cellular network and classifying the impact of detected interference conditions on performance of the wireless cellular network in the cell. The apparatus comprises a processor and a memory, the memory containing instructions executable by the processor such that the apparatus is operable to obtain data representing received signal power at a base station serving the cell of the over a period of time and obtain data representing a plurality of performance metrics for the cell over the time period. The apparatus is further operable to apply a Machine Learned model to the obtained data to classify the received signal power data into one of a plurality of cell interference conditions and to classify the performance metric data into one of a plurality of cell impact classes.

According to examples of the present disclosure, the apparatus may be further operable to carry out a method according to any one of the preceding aspects or examples of the present disclosure.

According to another aspect of the present disclosure, there is provided an apparatus for generating and training a model to detect interference conditions at a cell in a wireless cellular network and to classify the impact of detected interference conditions on performance of the wireless cellular network in the cell. The apparatus is adapted to, for each of a plurality of cells in the wireless cellular network, obtain data representing received signal power at a base station serving the cell over a period of time, and obtain a classification of the received signal power data into one of a plurality of cell interference conditions. The apparatus is further adapted to, for each of the plurality of cells in the wireless network, obtain data representing a plurality of performance metrics for the cell over the time period and obtain a classification of the performance metric data into one of a plurality of cell impact classes. The apparatus is further adapted to apply a Multi-Task Learning, MTL, Machine Learning, ML, algorithm to a training data set comprising the classified received signal power and performance metric data to generate a model for classifying received signal power data into one of the plurality of cell interference conditions and for classifying performance metric data into one of the plurality of cell impact classes.

According to examples of the present disclosure, the apparatus may be further adapted to carry out a method according to any one of the preceding aspects or examples of the present disclosure.

According to another aspect of the present disclosure, there is provided an apparatus for detecting interference conditions at a cell in a wireless cellular network and classifying the impact of detected interference conditions on performance of the wireless cellular network in the cell. The apparatus is adapted to obtain data representing received signal power at a base station serving the cell of the over a period of time and obtain data representing a plurality of performance metrics for the cell over the time period. The apparatus is further adapted to apply a Machine Learned model to the obtained data to classify the received signal power data into one of a plurality of cell interference conditions and to classify the performance metric data into one of a plurality of cell impact classes.

According to examples of the present disclosure, the apparatus may be further adapted to carry out a method according to any one of the preceding aspects or examples of the present disclosure.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Aspects of the present disclosure provide a method for generating and training a model to detect interference conditions at a cell in a wireless cellular network and to classify the impact of detected interference conditions on performance of the wireless cellular network in the cell. Further aspects of the present disclosure provide a method for detecting interference conditions at a cell in a wireless cellular network and classifying the impact of detected interference conditions on performance of the wireless cellular network in the cell.

Figure 1:
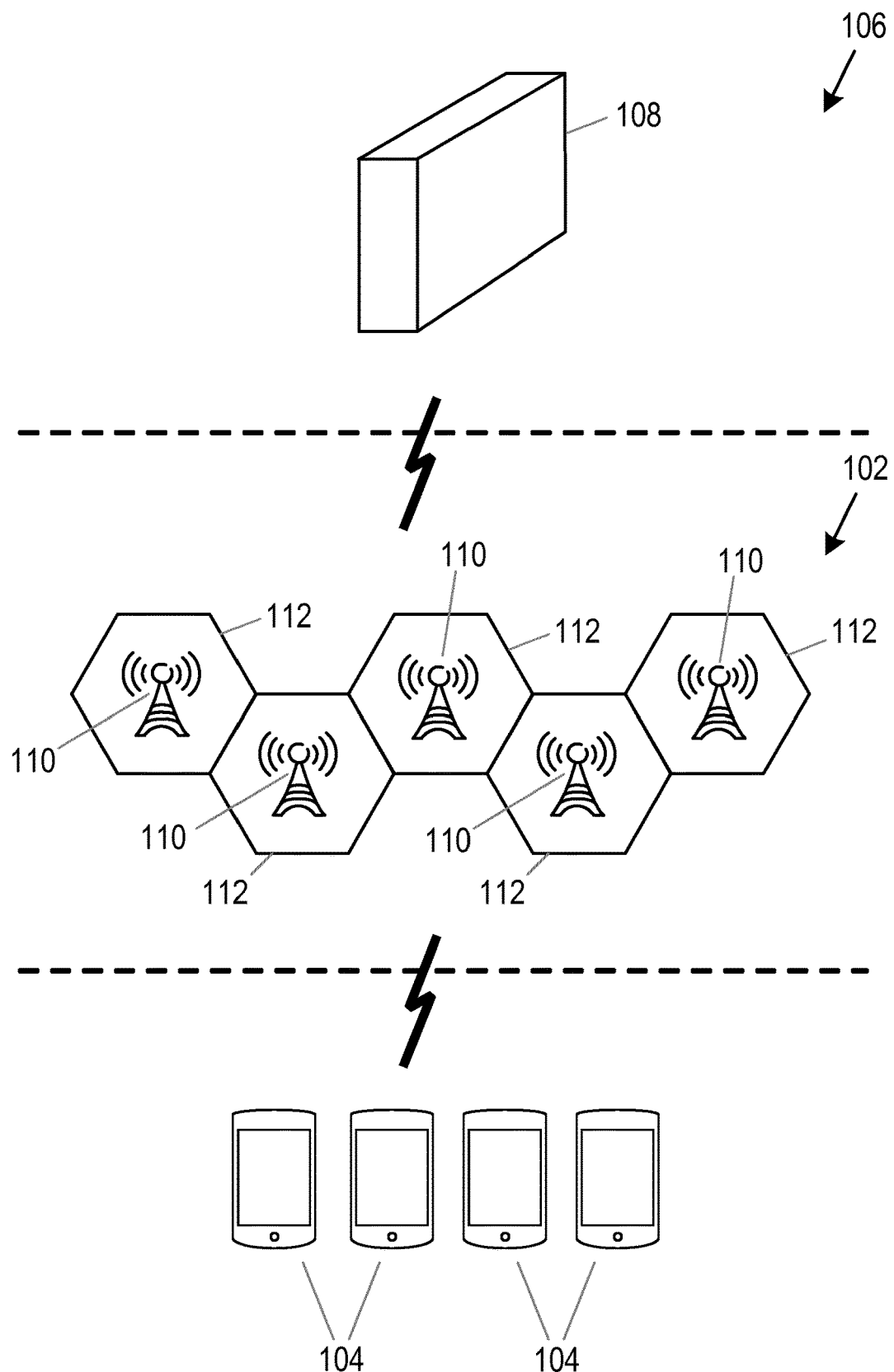
FIG. 1 shows a wireless communication system according to examples of the present disclosure.

FIG. 1 shows a wireless communication system according to examples of the present disclosure. In the illustrated example, the system comprises a radio access network 102, terminal devices such as wireless terminals or User Equipments (UEs) 104, and a core network 106. The core network 106 may comprise a plurality of core network servers 108, and/or may be in communication with one or more servers 108.

The radio access network 102 is a wireless cellular network comprising a plurality of radio access network nodes 110, each serving one or more cells 112. In the illustrated example, each radio access network node 110 serves a single cell 112; however, it will be appreciated that in different examples, a radio access network node 110 may be configured to serve more than one cell, and/or a single cell may be served by more than one radio access node. Such an arrangement may be found in a heterogeneous network deployment, comprising one or more macro nodes supported by one or more micro, femto or pico nodes.

As used herein, a radio access network node corresponds to any type of network node which communicates with a terminal device. Examples of radio access network nodes include NodeB, eNodeB, Master eNodeB, Secondary eNodeB, a network node belonging to a Master Cell Group (MSG) or Secondary Cell Group (SCG), base station (BS), Multi-Standard Radio (MSR) radio node such as MSR BS, eNodeB, gNodeB, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), etc. Where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The core network 106 comprises or is coupled to a server 108, which is therefore communicatively coupled to the radio access network 102. According to examples of the disclosure, the server 108 is configured to receive data from the radio access network 102, and to perform one or more methods for detecting interference conditions at a cell in a wireless cellular network and classifying the impact of detected interference conditions on performance of the wireless cellular network in the cell.

Methods for generating and training a model to detect interference conditions at a cell in a wireless cellular network and to classify the impact of detected interference conditions on performance of the wireless cellular network in the cell according to the present disclosure use a Machine Learning (ML) algorithm. ML techniques have been used with considerable success in the domains of computer vision, language processing and many other sub-field applications. One subfield of ML is Multi-Task Learning (MTL), in which a shared data model can handle different tasks. The basic idea of MTL is to learn a problem together with other related problems at the same time using a shared model representation. An overview of MTL can be found at https://arxiv.org/abs/1706.05098. Aspects of the present disclosure employ an MTL ML algorithm to train a model to both detect interference conditions and to classify the impact of such conditions on performance of a wireless network.

Figure 2:
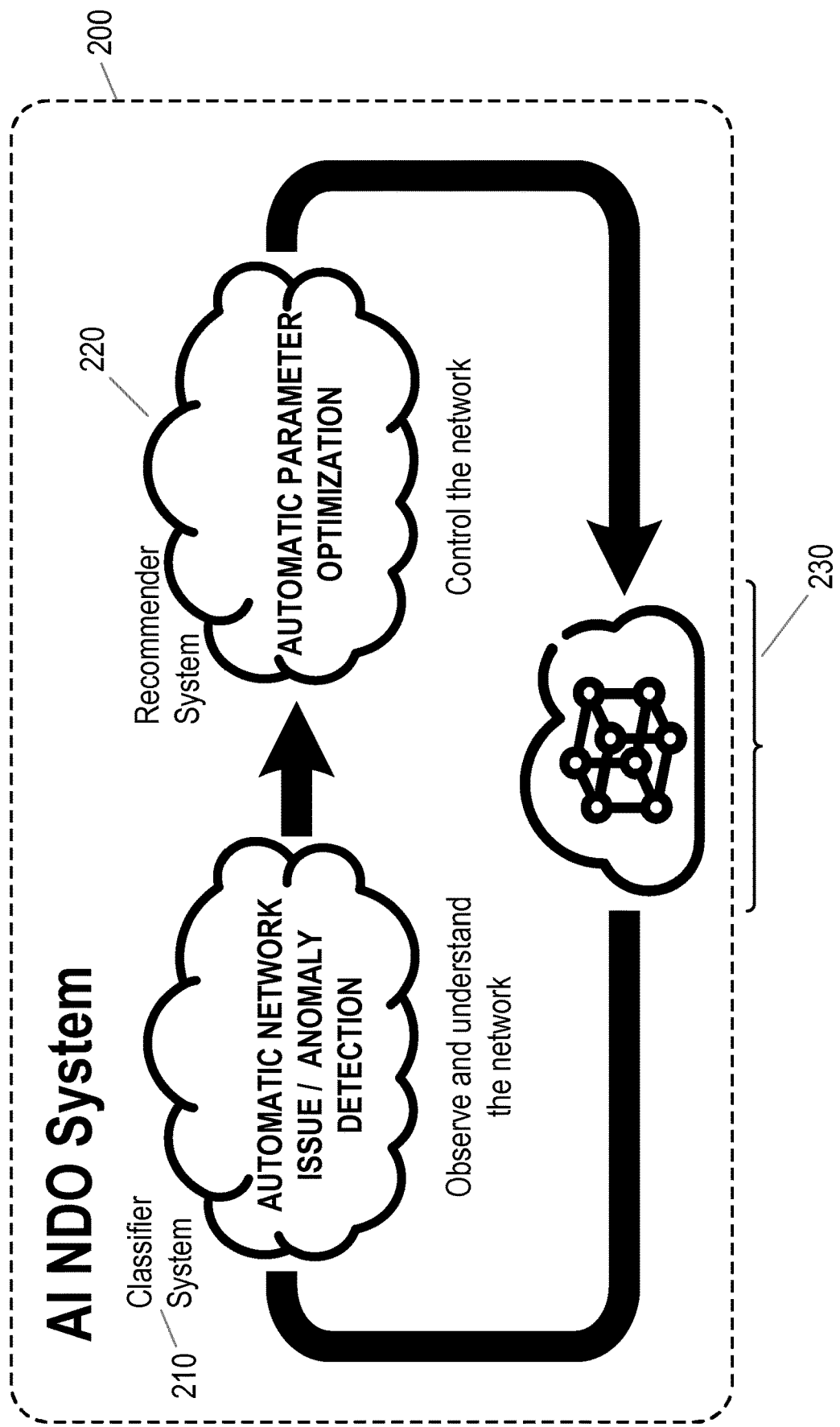
FIG. 2 illustrates an Artificial Intelligence (AI) system for network design and optimization (NDO)

FIG. 2 illustrates how the trained model for detecting interference conditions and classifying their impact may contribute to an Artificial Intelligence (AI) system for network design and optimisation (NDO). Referring to FIG. 2, the AI NDO system comprises a classifier system 210, recommender system 220, and implementation engine/feedback loop 230. The classifier system 210 automatically detects and classifies different issues in the network, allowing for the recommender system 220 to provide detailed root-cause analysis and potential actions to be implemented in the network. These recommendations can be implemented in the network and the resulting performance can be analysed and fed back to the classifier system via the implementation engine/feedback loop 230. Methods according to the present disclosure may contribute to the realisation of the classifying system 210, by training and using a model to achieve uplink interference issue detection and performance impact classification. Solving this complex task of automatic detection and classification may provide significant advantages in terms of scalability, accuracy, and automation, as discussed in further detail below.

According to a first example of the present disclosure, a method for generating and training a model applies a machine learning technique to learn from an annotated dataset to automatically detect, classify and rank eNodeB receiver uplink interference issues based on an MTL neural network model. Two different data sources are considered in the present disclosure: received signal power, for example in the form of interference signal per Physical Resource Block (PRB), and performance metrics for individual serving cells. MTL is applied to split the uplink interference classification into two tasks. The first task is to detect and classify the various uplink interference patterns based on the received signal power data. The second task uses the serving cell performance metric data to detect performance issues caused by the uplink interference and classify or rank their severity.

Figure 3:
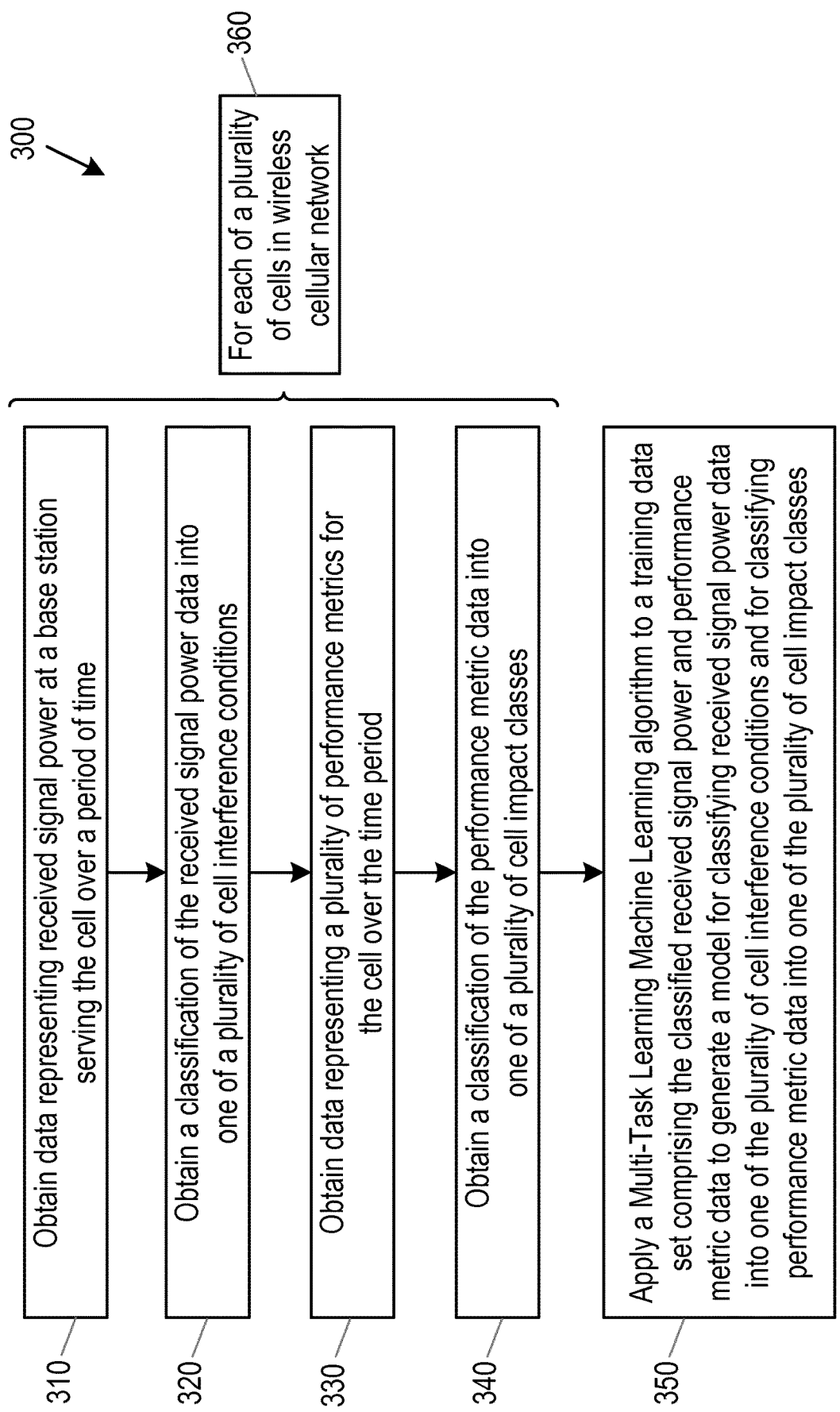
FIG. 3 is a flow chart illustrating process steps in a method according to an example of the present disclosure.

FIG. 3 is a flow chart illustrating process steps in a method 300 according to a first aspect of the present disclosure. The method 300 is for generating and training a model to detect interference conditions at a cell in a wireless cellular network and to classify the impact of detected interference conditions on performance of the wireless cellular network in the cell. The method may in some examples be carried out in a server comprised within or connected to a core network that is in communication with a cellular radio access network, or in other examples may be carried out by a virtualised application or network function running in the cloud. In further examples, the method may be carried out within a radio access node or virtual function logically connected to the radio access node.

Referring to FIG. 3, in a first step 310, the method 300 comprises obtaining data representing received signal power at a base station serving the cell of the wireless network over a period of time. The base station may comprise a radio access node such as a radio access node 110 as described above. The data representing received signal power at the base station may comprise interference signal power expressed per Physical Resource Block (PRB), and may in some examples comprise time series data. In step 320, the method 300 comprises obtaining a classification of the received signal power data into one of a plurality of cell interference conditions. The classification may be obtained from a human domain expert or from an automated or ML process, as explained in further detail below. The plurality of cell interference conditions may be predefined.

In step 330, the method 300 comprises obtaining data representing a plurality of performance metrics for the cell over the time period. In step 340, the method comprises obtaining a classification of the performance metric data into one of a plurality of cell impact classes. As for step 320, the classification may be obtained from a human domain expert or from an automated or ML process, as explained in further detail below. The plurality of cell impact classes may be predefined.

As illustrated at step 360, steps 310 to 340 are carried out for each of a plurality of cells in the wireless cellular network. The plurality of cells may comprise some or all of the cells of the wireless network.

In step 350, the method 300 comprises applying an MTL ML algorithm to a training data set comprising the classified received signal power and performance metric data to generate a model for classifying received signal power data into one of the plurality of cell interference conditions and for classifying performance metric data into one of the plurality of cell impact classes. For the purposes of the present specification, an MTL ML algorithm comprises a learning specification operable for execution on a computational model, which specification solves more than one learning task concurrently, exploiting commonalities between the tasks. The computational model on which the MTL ML algorithm is executed may for example comprise a neural network such as a deep neural network. In some examples of the present disclosure, the neural network on which the MTL ML algorithm is executed may be a convolutional neural network.

Figure 4:
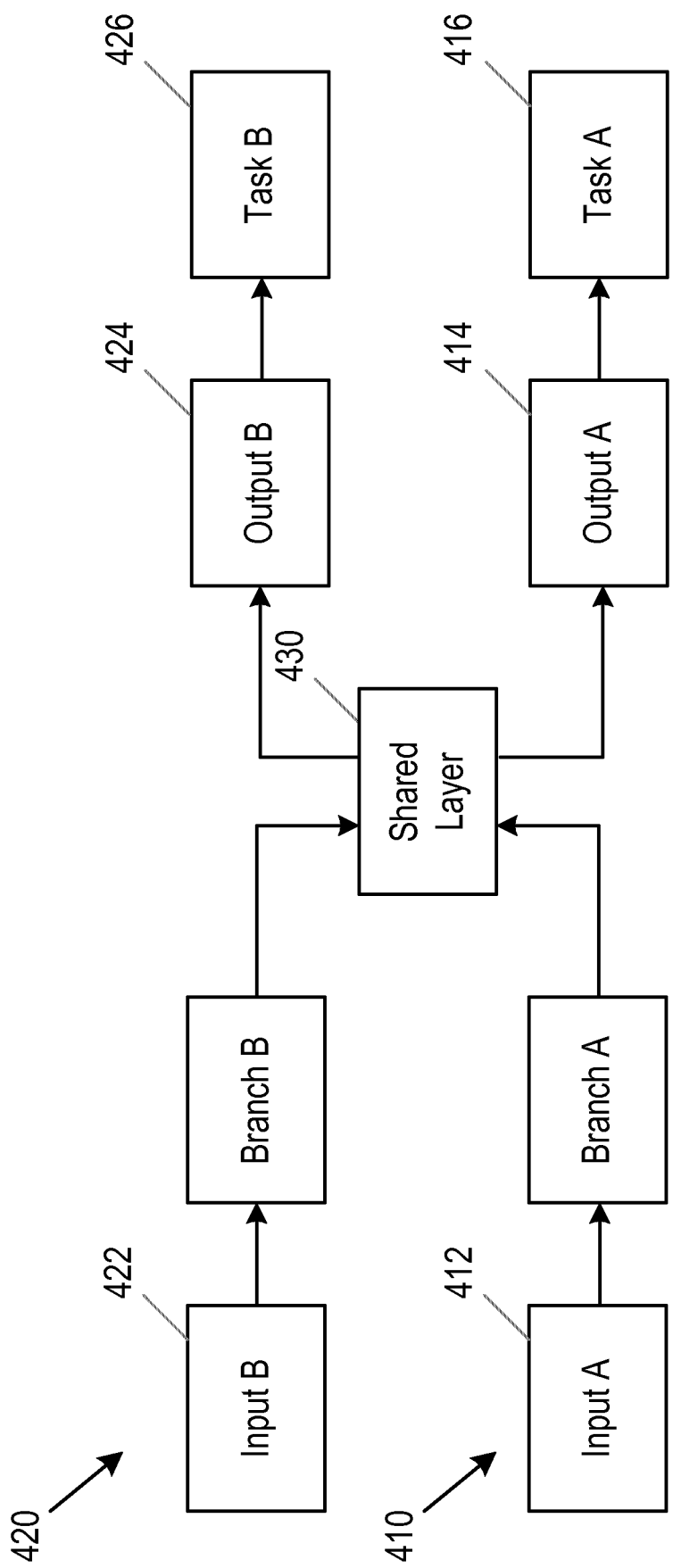
FIG. 4 is a flow chart illustrating a general approach to building a neural network model using an MTL ML algorithm

FIG. 4 depicts a general approach to building a neural network model using an MTL ML algorithm. FIG. 4 illustrates two branches A 410 and B 420, corresponding to the two tasks A and B for which the model is to be trained. In the context of the present disclosure, task A may be considered as the task of detecting interference conditions and task B may be considered as the task of classifying the performance impact of detected conditions. Tasks A and B are therefore distinct but related, each having their own input data 412, 422. Input A 412 is the received signal power data and input B 422 is the cell performance metrics. Commonalities between tasks A and B are exploited in the shared layers 430 of the architecture over which the MTL ML algorithm is run, allowing for training of a single model that can provide dedicated outputs 414, 424 for the two separate tasks A and B. Task A 416 (detecting interference conditions) may be considered as the main task for the model, with additional insight for learning being gained from the auxiliary task B 424 (classifying cell performance impact).

Figure 5:
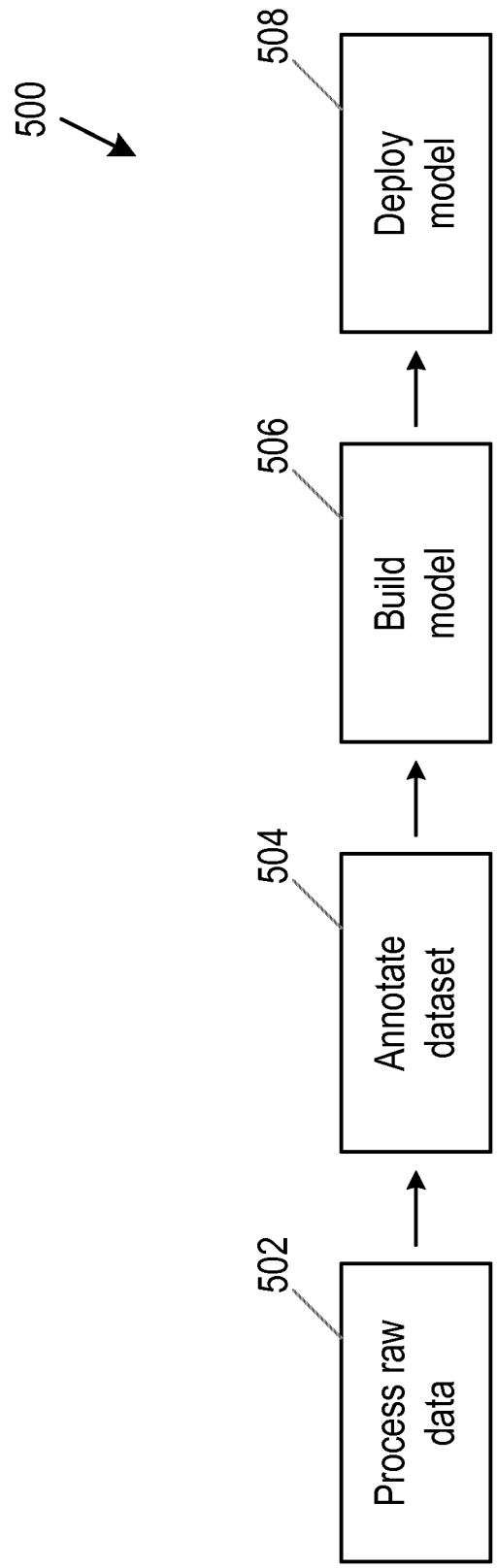
FIG. 5 is a flow chart providing an overview of steps for training and using a model in the field.

FIG. 5 is a flow chart providing an overview of steps for training and using a model in the field. In step 502, raw data is obtained and processed to provide inputs for the tasks to be carried out by the trained model. In the examples of the present disclosure, the raw data comprises received signal power data and cell performance metric data which may be pre-processed as discussed in further detail below. In step 504, the data is annotated to provide classifications of the raw data for the purposes of training the model. This annotation may be performed manually or using a further ML model. In step 506, the shared model for performing the two tasks is trained and evaluated using the annotated data. Finally, upon obtaining satisfactory model performance, the trained model is deployed in step 508 as part of the network optimisation platform.

Figure 6A:
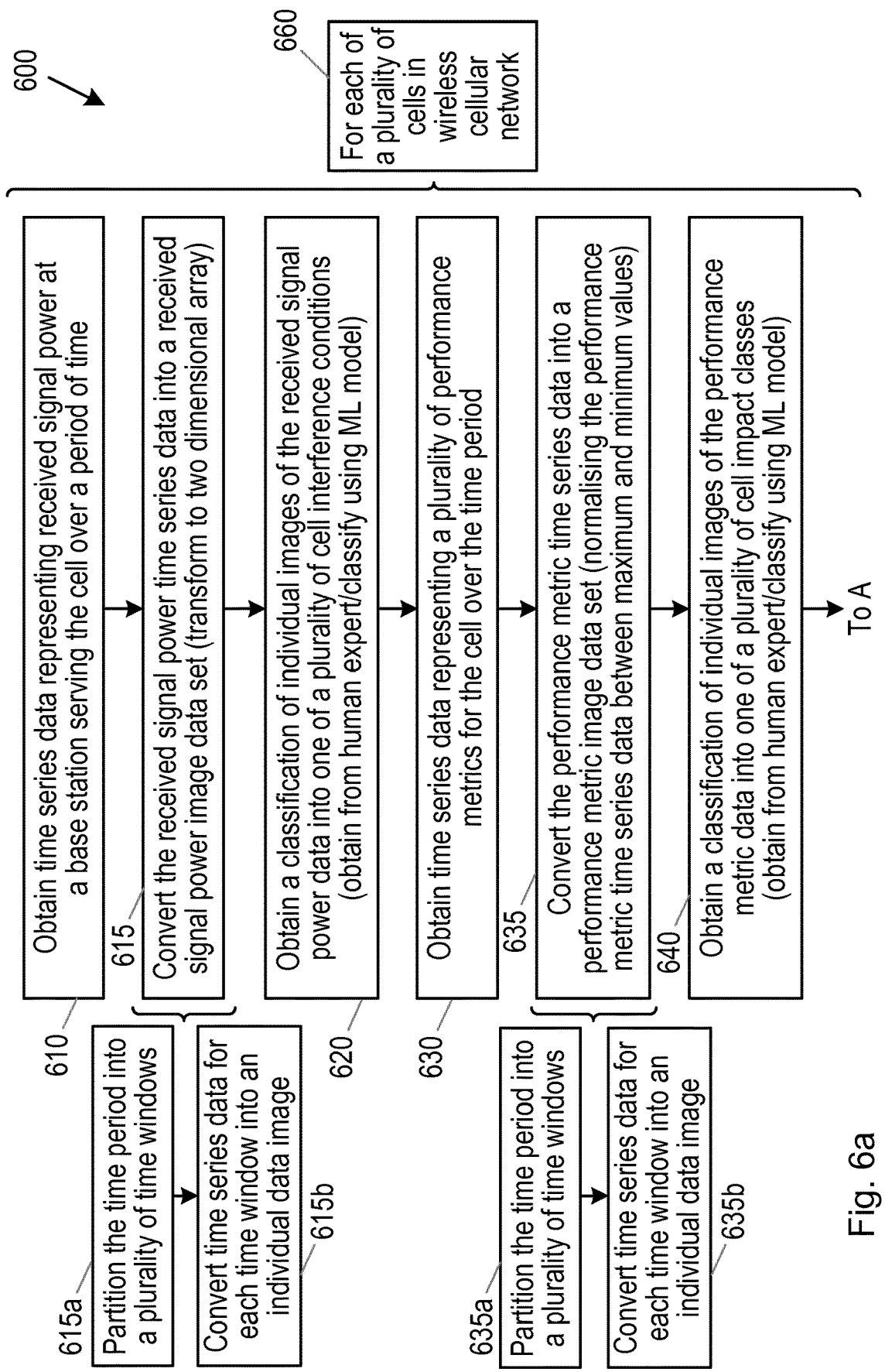
FIGS. 6a and 6b show a flow chart illustrating process steps in another method according to an example of the present disclosure.
Figure 6B:
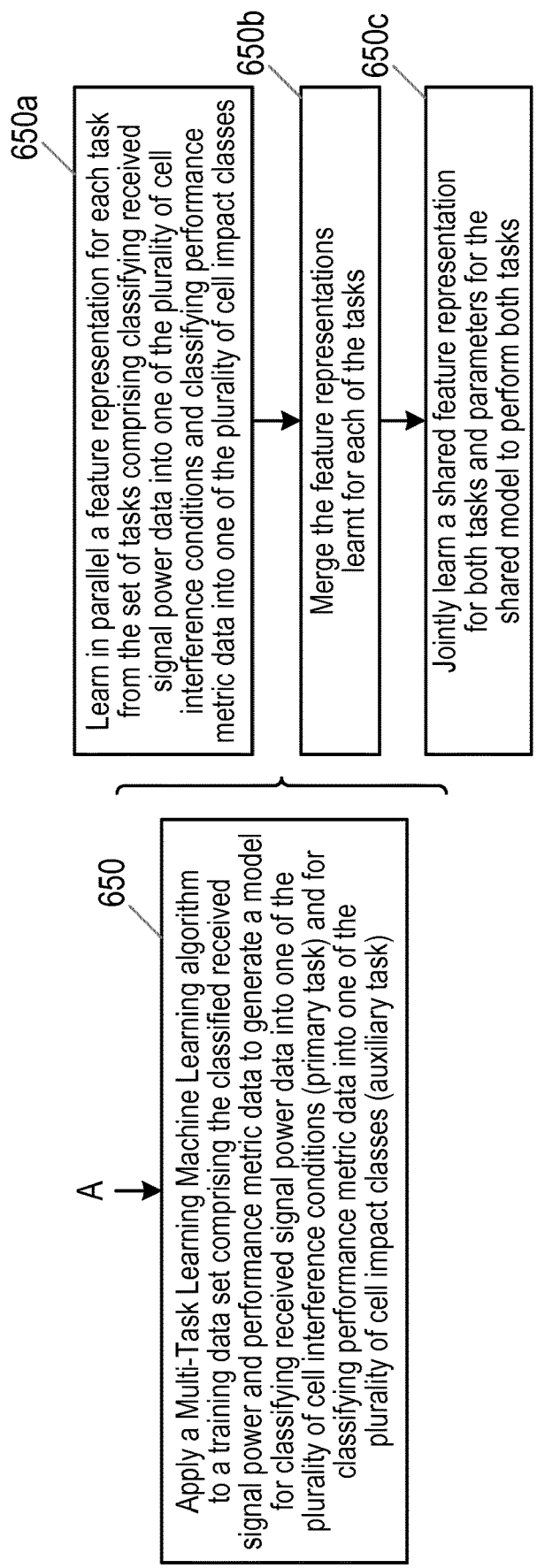

FIGS. 6a and 6b show a flow chart illustrating process steps in another example of a method 600 for generating and training a model to detect interference conditions at a cell in a wireless cellular network and to classify the impact of detected interference conditions on performance of the wireless cellular network in the cell. The steps of the method 600 illustrate one way in which the steps of the method 300 may be implemented and supplemented in order to achieve the above discussed and additional functionality.

As for the method of FIG. 3 above, the method 600 may be carried out in a server comprised within or connected to a core network that is in communication with a cellular radio access network, or in other examples may be carried out by a virtualised application or network function running in the cloud. In further examples, the method may be carried out within a radio access node or virtual function logically connected to the radio access node.

Referring to FIG. 6a, the method comprises, in step 610, obtaining time series data representing received signal power at a base station serving the cell over a period of time.

The base station may comprise a radio access node such as a radio access node 110 as described above. The received signal power may comprise interference signal power expressed per Physical Resource Block (PRB). In step 615, the method comprises converting the received signal power time series data into a received signal power image data set. Images in the received signal power image data set may comprise a first dimension representative of time and a second dimension representative of uplink received power of individual Physical Resource Blocks, PRBs, and each image pixel may represent a value of received signal power for a particular PRB at a particular time instant. As illustrated in step 615, converting the received signal power time series data to an image data set may comprise transforming the data to a standardised 2 dimensional array. In some examples, the number of PRBs may vary across cells depending upon the bandwidth allocation for different carriers. Transforming the data to a standardised array may therefore ensure comparability between image data sets. As illustrated in steps 615a and 615b, the step of converting the received signal power time series data to an image data set comprises partitioning the time period into a plurality of time windows and converting time series data for each time window into an individual data image. The same partitioning into time windows is applied to all of the cells for which data is obtained and converted.

In step 620, the method 600 comprises obtaining a classification of the received signal power data into one of a plurality of cell interference conditions, which conditions may be predefined. The classification may be obtained from a human domain expert or from an automated or ML process, as explained in further detail below. Obtaining a classification of the received signal power data into one of a plurality of cell interference conditions may comprise obtaining a classification of individual images of the received signal power image data set into one of the plurality of cell interference conditions, such that a classification is obtained for each image. Obtaining a classification may comprise obtaining a classification performed by a human expert or classifying the received signal power data into one of a plurality of cell interference conditions using an ML model. The ML model may be a neural network, for example comprising one or more autoencoders for feature extraction, which features may be input to a clustering algorithm.

In step 630, the method 600 comprises obtaining time series data representing a plurality of performance metrics for the cell over the time period. In step 635, the method comprises converting the performance metric time series data into a performance metric image data set. Images in the performance metric image data set may comprise a first dimension representative of time and a second dimension representative of performance metric, and each image pixel may represent a value for a particular performance metric at a particular time instant. As illustrated in step 635, converting the performance metric time series data to an image data set may comprise normalising the performance metric time series data between maximum and minimum values to facilitate comparison. Normalisation values may be defined based on domain knowledge, and will often not be equal to the minimum and maximum value of the dataset but selected on the basis of the dataset. Each performance metric may have a different value range. Following normalisation, the values for the different performance metrics may range between 0 and 1. As illustrated in steps 635a and 635b, the step of converting the performance metric time series data to an image data set comprises partitioning the time period into a plurality of time windows and converting time series data for each time window into an individual data image. The same partitioning into time windows is applied to all of the cells for which data is obtained and converted.

In step 640, the method comprises obtaining a classification of the performance metric data into one of a plurality of cell impact classes, which classes may be predefined. The classification may be obtained from a human domain expert or from an automated or ML process, as explained in further detail below. Obtaining a classification of the performance metric data into one of a plurality of cell impact classes may comprise obtaining a classification of individual images of the performance metric image data set into one of the plurality of cell impact classes, such that a classification is obtained for each image. Obtaining a classification may comprise obtaining a classification performed by a human expert or classifying the performance metric data into one of a plurality of cell impact classes using an ML model. The ML model may be a neural network, for example comprising one or more autoencoders for feature extraction, which features may be input to a clustering algorithm.

As illustrated at step 660, steps 610 to 640 are carried out for each of a plurality of cells in the wireless cellular network. The plurality of cells may comprise some or all of the cells of the wireless network.

Referring now to FIG. 6b, in step 650, the method 600 comprises applying an MTL ML algorithm to a training data set comprising the classified received signal power and performance metric data to generate a model for classifying received signal power data into one of the plurality of cell interference conditions (as a primary task) and for classifying performance metric data into one of the plurality of cell impact classes (as an auxiliary task).

As illustrated in FIG. 6b, the step 650 of applying an MTL ML algorithm comprises three sub steps. The first sub step 650a, comprises learning in parallel a feature representation for each task from the set of tasks comprising classifying received signal power data into one of the plurality of cell interference conditions and classifying performance metric data into one of the plurality of cell impact classes. The feature representations may in some examples comprise feature maps generated by passing different filters over the individual images of the image data sets. Learning feature representations may comprise learning the filters to use to generate the feature maps. The second sub step 650b comprises combining the feature representations learnt for each of the tasks. In some examples, combining comprises concatenating the feature representations learnt for each of the tasks. The third sub step 650c comprises jointly learning a shared feature representation for both tasks and parameters for the shared model to perform both tasks, for example by optimising a loss function for the tasks.

Additional detail of the steps for converting time series data into image data, obtaining classifications and applying an MTL ML algorithm to train the model is discussed below.

In steps 610 and 630 of the method 600, and steps 310 and 330 of the method 300, time series data for received signal power and a plurality of performance metrics are obtained for individual cells of a plurality of cells within the wireless cellular network. The raw input data may be collected from various data sources, including the individual base stations or radio network nodes, one or more management nodes associated with the wireless cellular network, a core network node etc. The plurality of cells for which data is obtained may for example comprise cells in a particular geographical area, or cells belonging to a particular network operator. The data collected for the cells covers a period of time, which may for example be measured in second, minutes hours, days etc. In one example, the time period several days long.

The time series data obtained according to the methods 300, 600 comprises two sets of input data, each set of input data being specific to one of the tasks to be carried out by the trained model. The received signal power data is input data for the task of detecting interference conditions, and the performance metric data is input data to the task of classifying a cell performance impact of the detected interference conditions.

The performance metrics monitored for each cell may relate to the load experienced by the cell, the radio conditions experienced by terminal devices served by the cell, etc. It will be appreciated that the proposed method is not limited to the relatively few well-known performance metrics that are frequently used in network management methods, but may include a relatively large number of performance metrics, including otherwise unconventional performance metrics. For example, the performance metrics may include one or more of:

Active number of downlink and uplink users per Time Transmission Interval (TTI)
Downlink and uplink scheduling entities per TTI
Radio resource control (RRC) connection attempts
Average and maximum number RRC connected users
Downlink and uplink data volume for Data Radio Bearer (DRB) traffic
Downlink and uplink data volume for Signaling Radio Bearer (SRB) traffic
Downlink and uplink Physical Resource Block (PRB) utilization
Physical Downlink Control Channel (PDCCH) Control Channel Element (CCE) load
Average Channel Quality Indicator (CQI)
Rate of CQI below a threshold (e.g. below 6)
Downlink and Uplink user throughput
Downlink and Uplink cell throughput
Radio Access Channel (RACH) attempts
Random access success ratio
Downlink and uplink Hybrid ARQ (HARQ) discontinuous transmission ratio
Average Physical Uplink Shared Channel (PUSCH) Signal-to-Noise-Ratio (SINR)
Average Physical Uplink Control Channel (PUCCH) SINR
PUSCH SINR below −2 dB rate
PUCCH SINR below 0 dB rate
PUSCH interference level
PUCCH interference level
Average pathloss
Pathloss below 130 dB rate
UE power limitation rate
Average processor load
90th percentile of processor load After the time series data for received signal power and performance metrics has been obtained, and before conversion to image data sets, the data may be subject to one or more data cleansing techniques, for example to ensure that missing data, erroneous data, outliers and inconsistent data, etc., are handled in a consistent way. In addition, the performance metric data may be normalised, for example as discussed in European patent application EP18382407.7.

In steps 615 and 635, the time series data is converted to image data sets. Each image data set comprises a plurality of images, each image representing the data over a particular time window in the time period. The time window may for example comprise a window of several second, minutes or hours, and in one example comprises a window of 24 hours. The conversion to image data may be achieved by transforming the (normalized) time series data into a 3D array representation. One example of how to perform this transformation is provided in European patent application EP18382407.7

The transformed data may be arranged in a variety of different ways, and the present disclosure is not limited in that respect. In one example, the image data set may be arranged as shown in FIGS. 7 to 9.

Figure 7:
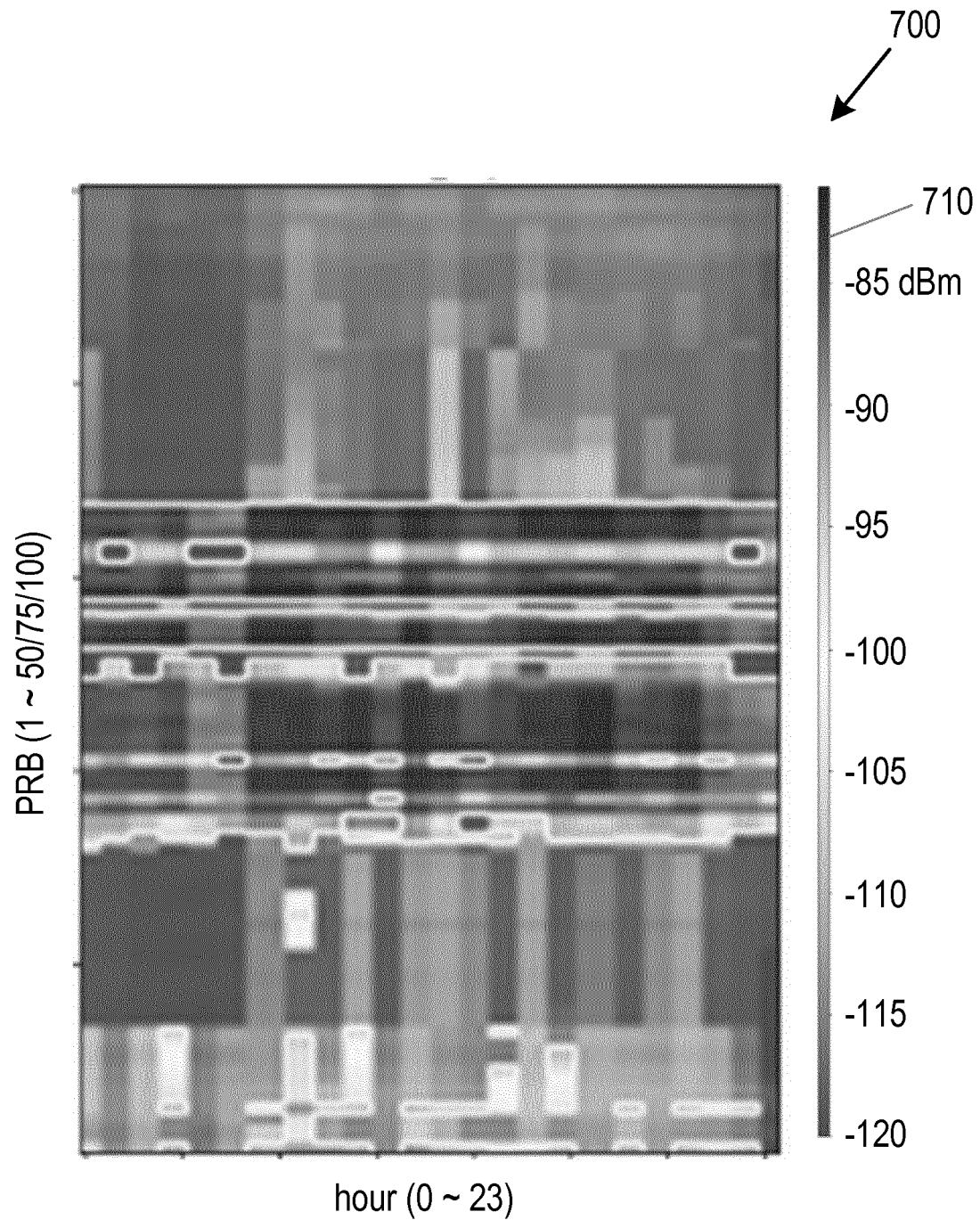
FIG. 7 illustrates received signal power data for a cell in the form of a heat map.

FIG. 7 illustrates received signal power data (interference signal power per Physical Resource Block), for a cell over a time window of 24 hour in the form of a heat map 700. The heat map 700 represents time in hours along the X axis and uplink PRB of a particular cell on the Y axis. The number of uplink PRBs will dependent upon the carrier bandwidth allocated to the cell, and may for example be 50, 75 or 100 PRBs in a cell of a Long Term Evolution network. Each pixel of the image represents a value of the received signal power in the cell at the corresponding time and in the PRB corresponding to the pixel's position on the heat map 700. The value of each pixel may be indicated by a colour or shade at the pixel's position on the heat map. A scale 710 for the intensity of the heat map is illustrated in FIG. 7. It will be appreciated that the image data may not actually be displayed in the manner illustrated in FIG. 7.

Figure 8A:
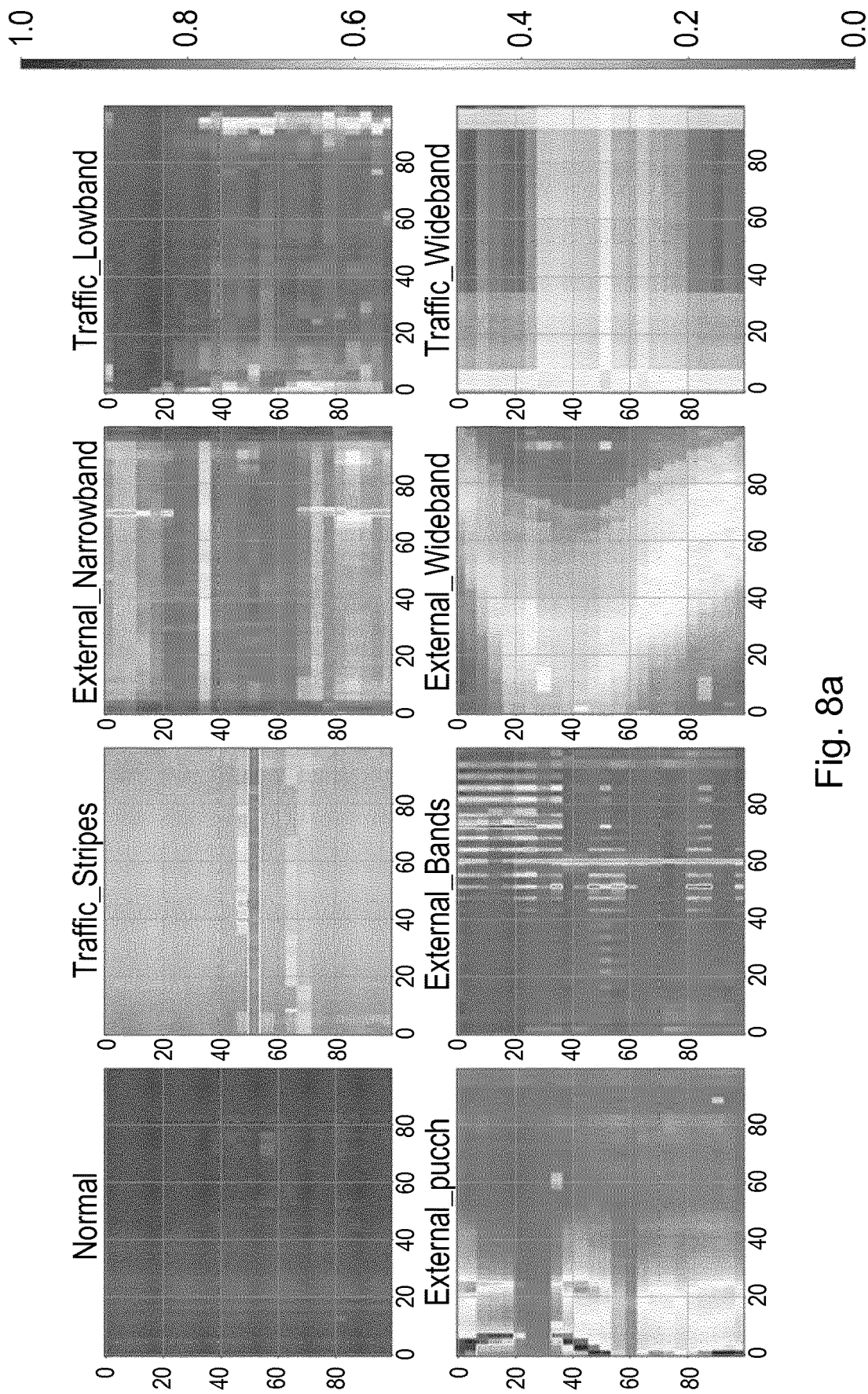
FIGS. 8a and 8b illustrate heat maps for different uplink interference patterns corresponding to different interference conditions in a cell.
Figure 8B:
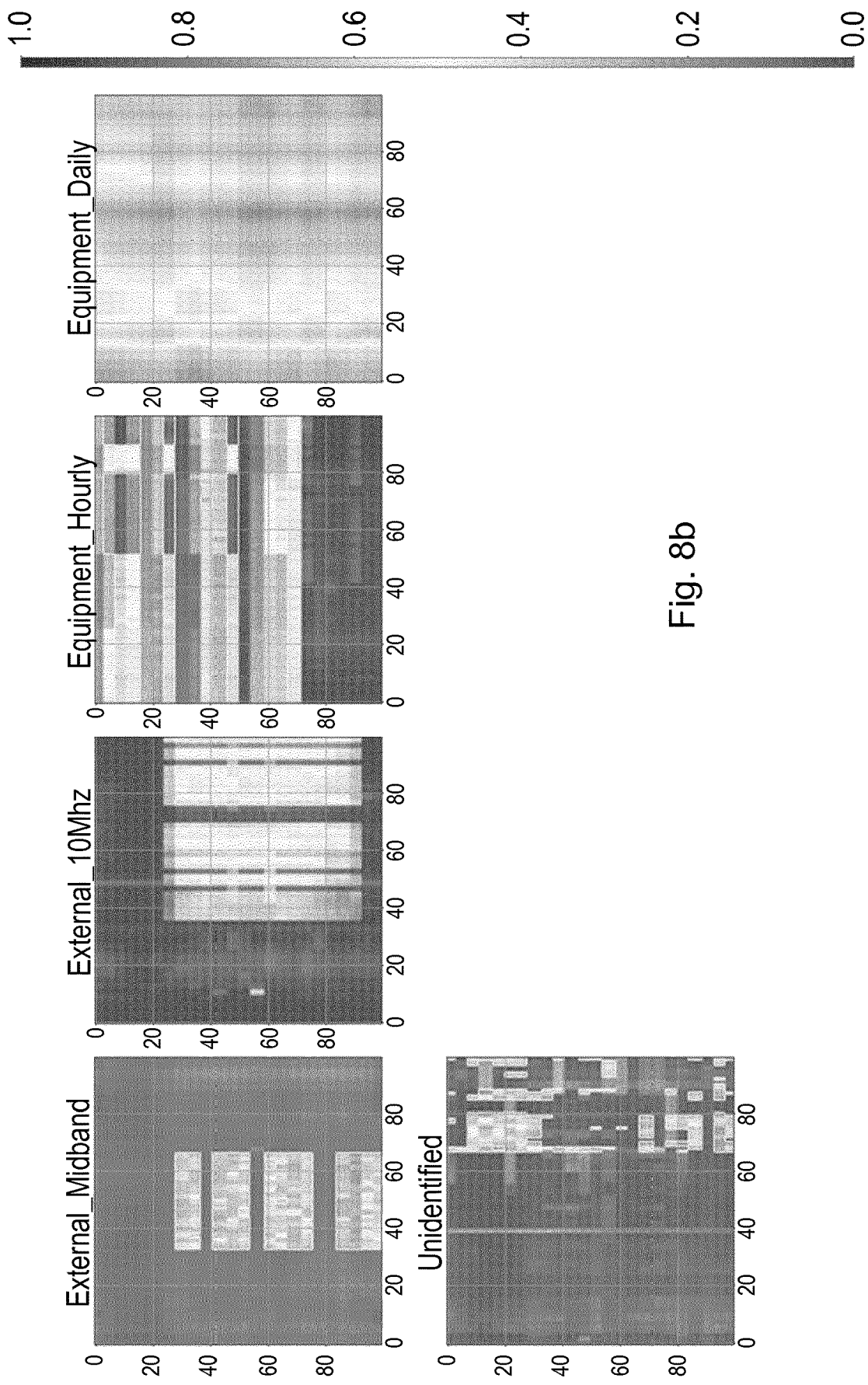

FIGS. 8a and 8b illustrate heat maps for different uplink interference patterns corresponding to different interference conditions in a cell. Example interference conditions illustrated in FIGS. 8a and 8b include interference related to external interferers (External Narrowband, External pucch, External Bands, External Wideband External Midband, External 10 MHz,), interference related to hardware faults (Equipment Hourly, equipment Daily), traffic related interference (Traffic Stripes, Traffic Lowband, Traffic Wideband), etc. In the heat maps of FIGS. 8a and 8b, the data has been transformed from 50/75/100 PRB×24 hours to a standardised 100×200 2-dimensional array.

Figure 9A:
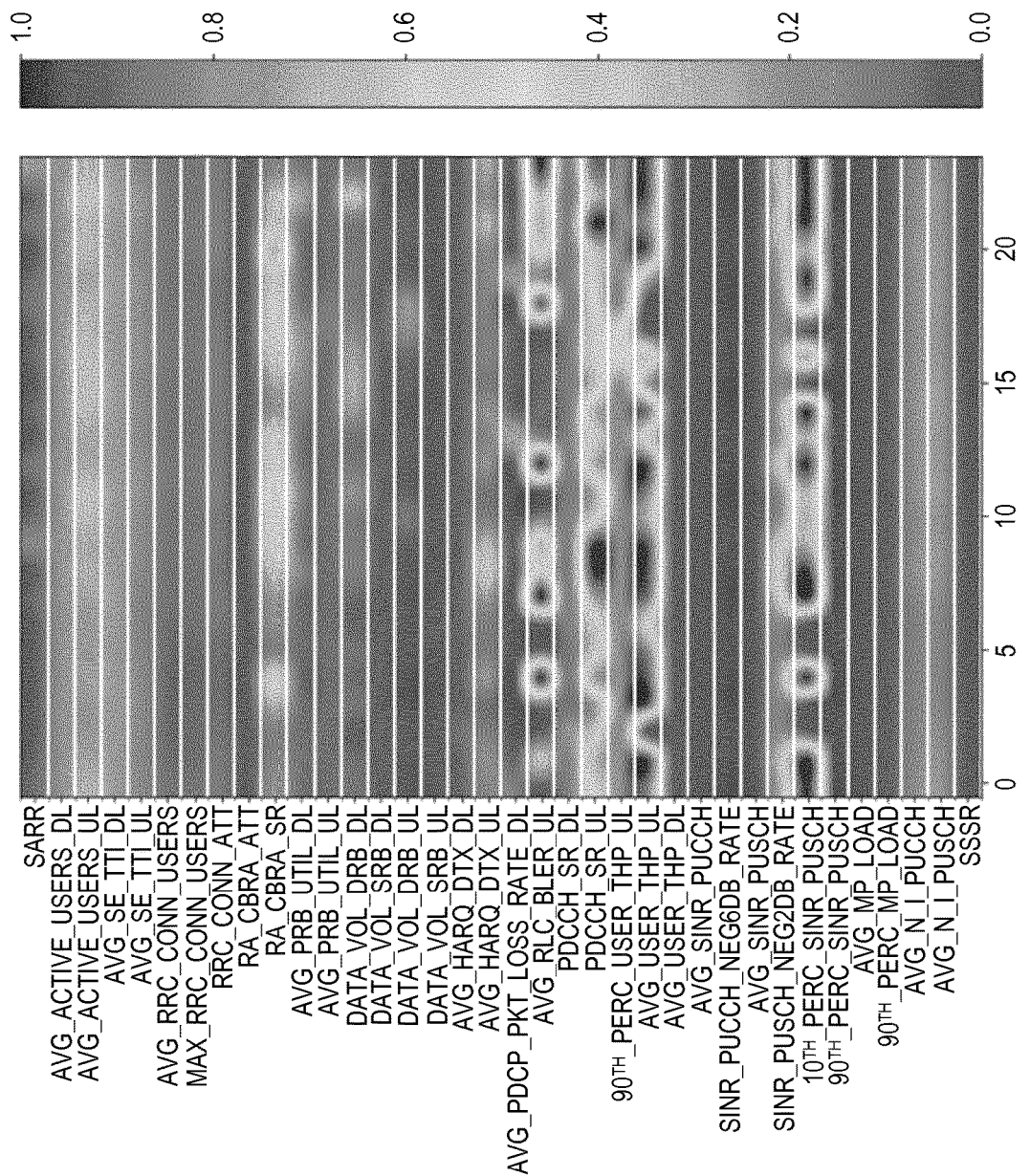
FIGS. 9a, 9b, 9c and 9d illustrate heat maps for performance metrics in a cell.

FIGS. 9a, 9b, 9c and 9d illustrate heat maps for performance metrics. Referring initially to FIG. 9a, the different performance metrics are arranged on the Y axis of the heat map and time is shown on the X axis. A pixel value at (x,y) corresponds to the (normalized) value for the yth performance metric at time x. As in the heat maps of FIGS. 7, 8a and 8b, the value of a particular pixel may correspond to a colour or shade on the heat map, although the image data may not actually be displayed in this manner. It will be appreciated that the performance metrics should be arranged consistently (e.g., in the same order) for each image data set, and that the size of the time window should be the same for all image data sets.

Figure 9B:
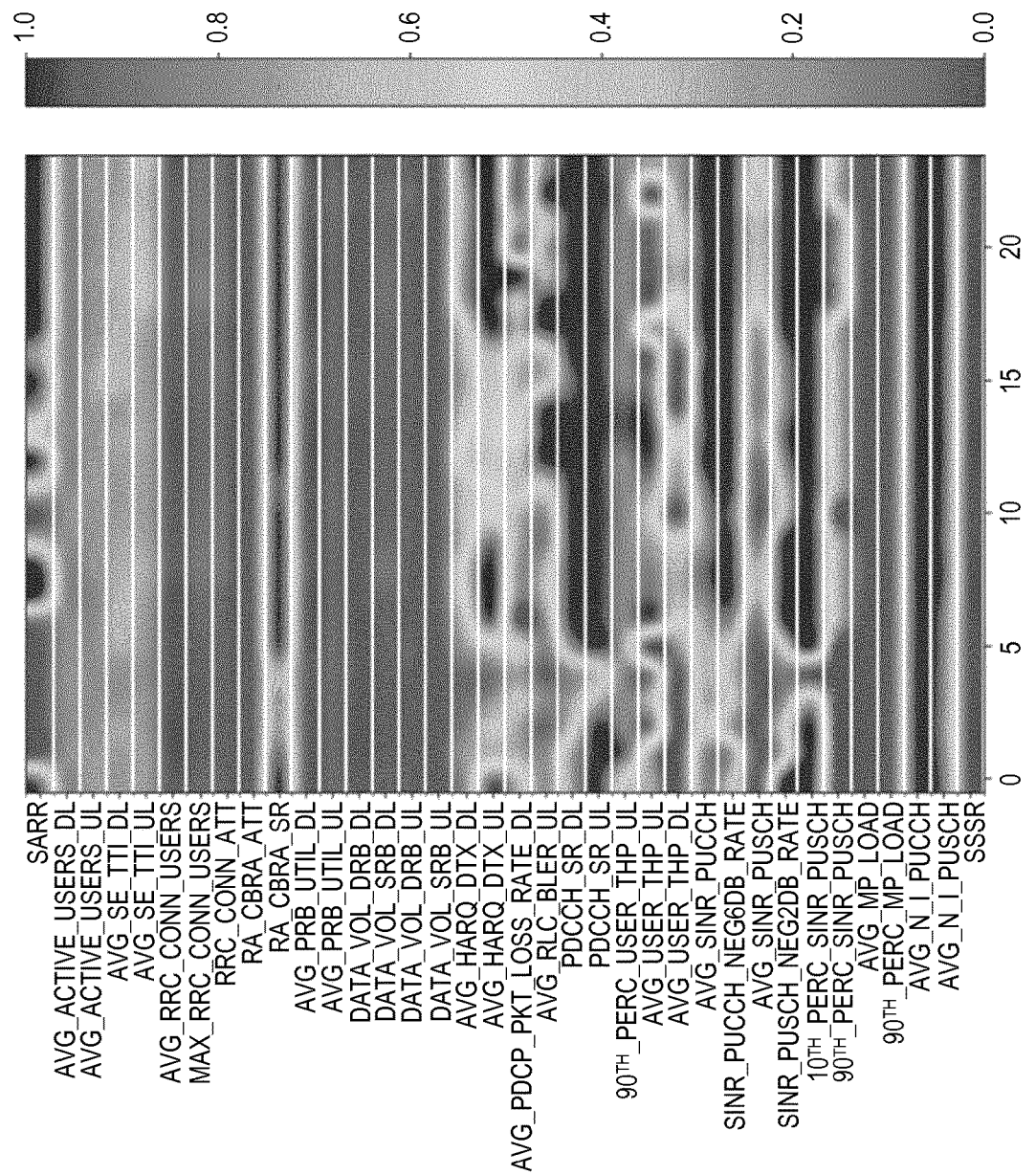
Figure 9C:
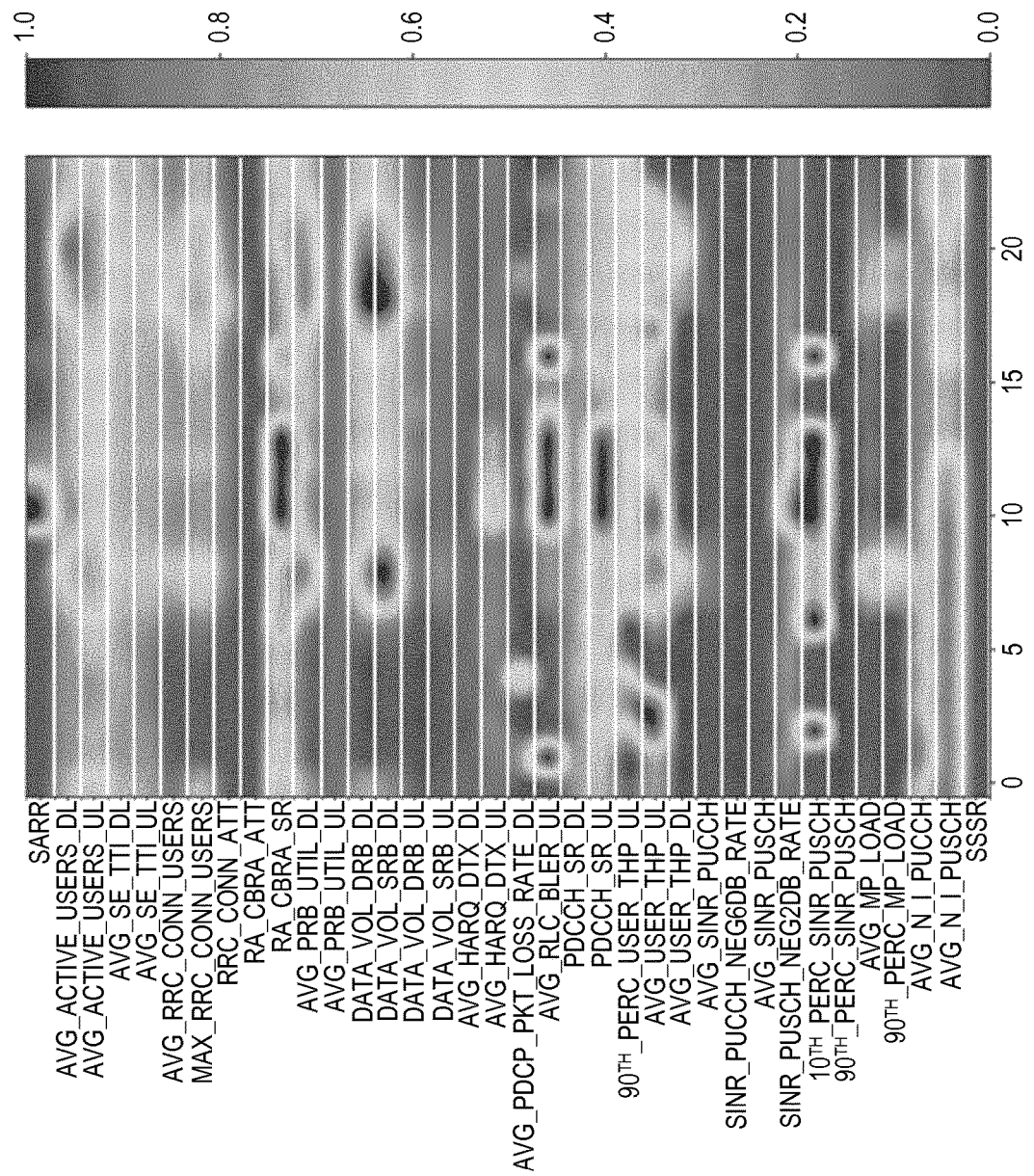
Figure 9D:
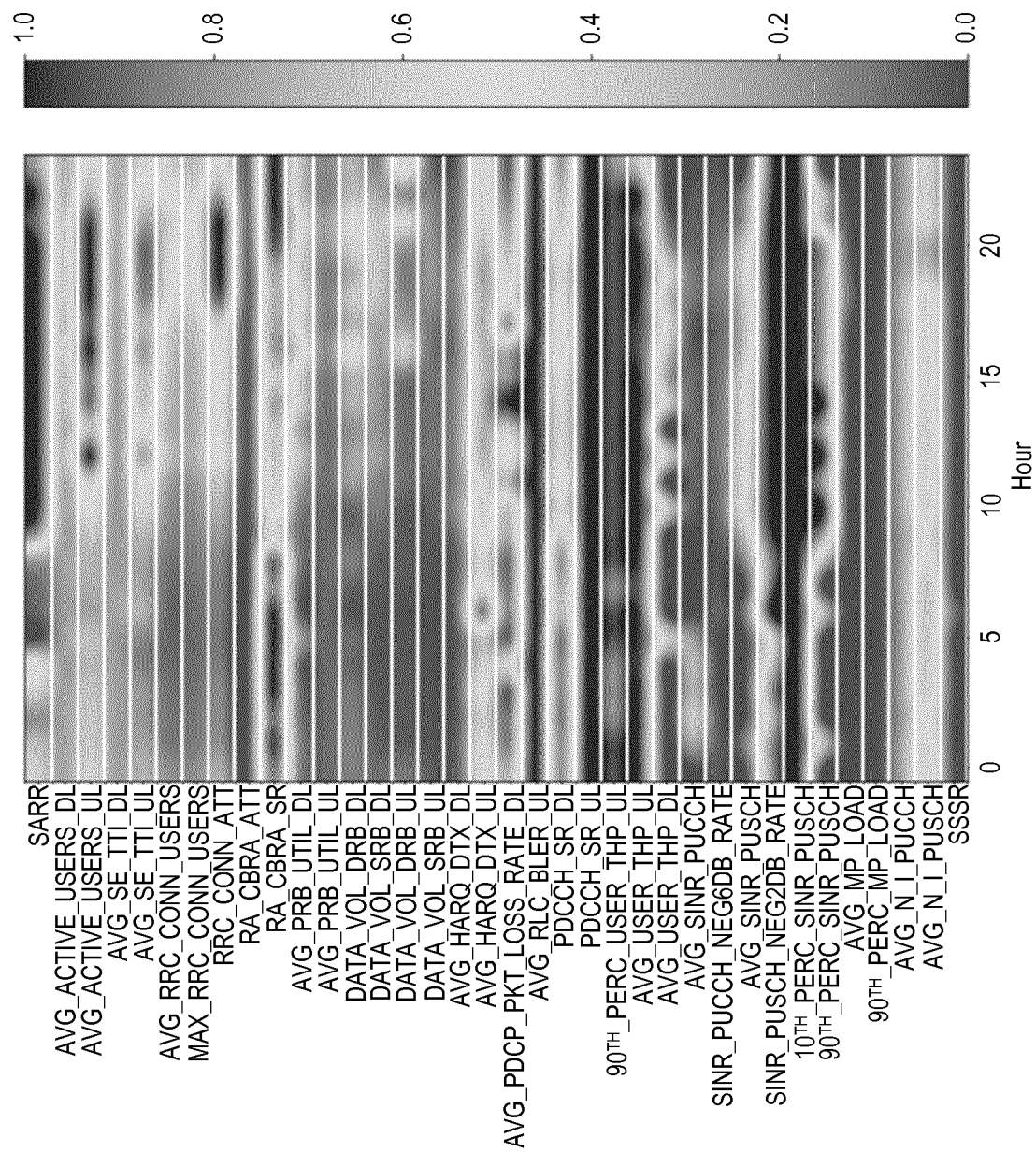

The heat maps of FIGS. 9a to 9d illustrate different cell performance impact patterns. FIG. 9a illustrates low uplink activity and low performance impact. FIG. 9b illustrates low uplink activity and high performance impact. FIG. 9c illustrates high uplink activity and low performance impact. FIG. 9d illustrates high uplink activity and high performance impact. Individual symptoms of such patterns including for example high uplink packet loss rate, high uplink re-transmission, low uplink user throughput etc. can be observed from the heat maps. It will be appreciated that analysis of multiple performance metrics over a single time window may assist with identifying the precise performance impact for a particular cell, inferring information regarding not only the nature of the performance impact but also the nature of the uplink activity from the multiple different performance metrics.

The image representation discussed above allows additional information to be extracted about the time and space relationships of signal power on different PRBs and different performance metrics. These relationships form complex patterns which often cannot be detected by conventional classification systems or the human eye. Based on the proposed image representation, key representative features of these patterns can be learned.

Transforming the detection and classification tasks into an image pattern recognition problem enables the usage of very powerful Convolutional Neural Networks (CNNs) to create a classifier model for detecting a large variety of cell interference conditions and classifying the performance impact of these conditions. This has important advantages because CNNs can significantly reduce complexity as well as overfitting compared to commonly used Multi-Layer Perceptron (MLP) networks. Using CNNs allows relevant features to be efficiently detected and enables more generic feature learning compared to MLP networks, producing a set of feature maps at each convolutional layer. These generic learned features can be used for all positions on the image. This has the advantage that cell conditions can be detected independent of their time of occurrence (day or night-time, busy hour, etc.).

improve the performance of a model by leveraging a related task. Multi-task learning consists of two main components: a) The architecture used for learning and b) the auxiliary task(s) that are trained jointly.

Examples of the present disclosure identify both uplink interference pattern and performance impact severity by learning both tasks in parallel: leveraging the information contained in the target value of other related tasks during learning process.

The domain of both tasks is related (network performance management domain, wherein the network may be any wireless cellular network such as LTE, 5G etc.), meaning a single model can be trained which not only is able to automatically detect uplink interference issues but at the same time identify the performance impact caused by those issues. As is demonstrated below, example methods of the present disclosure improve model performance when compared to single tasks learning as well as enabling a model to be trained using a smaller training dataset. A smaller training dataset means less annotation, making the training phase more efficient.

An example MTL ML algorithm for use in steps 350 and 650 is provided below:

```
Algorithm - Multi-task Learning for Issue Classification
Input: Training data {(x_{t,i}, y_{t,i})}_{i=1}^{m}, number of tasks t ∈ {1,2 ... T}
   1.  Initiate model weight, W = {w_1, w_2 ... w_n}
   2.  While not converge
           For t ∈ [T], parallel do
              learn feature abstract
           end parallel do For t ∈ [T], do
              merge feature abstract
           end do jointly learn shared model and shared feature representation
           minimize total loss (categorical cross entropy) for t ∈ [T]
       end while
Output: Weight, W, prediction probability for each class {(ŷ_{t,i})}_{i=1}^{m}, t ∈ {1,2 ... T}
```

Steps 320, 340, 620 and 640 comprise obtaining classifications of the input data. These classifications classify the received signal power data into one of a plurality of cell interference conditions, and classify the performance metric data into one of a plurality of cell impact classes. The cell interference conditions and cell impact classes may be predefined. Example cell interference conditions and cell impact classes include those discussed above with reference to the heat maps of FIGS. 7 to 9. As discussed above, the classification may be performed by a human expert and provided to a node, function or other entity carrying out the methods.

In further examples, obtaining the classification of steps 320, 340, 620, 640 may comprise performing the classification using an ML model which may be unsupervised, and thus not requiring any input from a human expert to label training data. In some examples, the classified data may additionally be augmented. An example unsupervised ML model and process for classifying image data sets, and an example method of data augmentation, are discussed in European patent application EP18382407.7.

Steps 350 and 650 comprise applying an MTL ML algorithm to the classified data to generate a model for carrying out the two tasks of detecting cell interference conditions and classifying performance impact of the detected conditions. Multi-task learning can be used to The loss function used for the joint learning may for example by a categorical cross entropy loss function for multiple class models:

$$-\frac{1}{N}\sum_{i=1}^{N}\sum_{c=1}^{C} 1_{y_i \in C_c} \log P_{model}[y_i \in C_c]$$

where:

N is the total number of observations

C is the total number of categories $1_{y_i \in C_c}$ is the indicator function of the ith observation belonging to the cth category $P_{model}[y_i \in C_c]$ is the probability predicted by the model for the ith observation to belong to the cth category.

The model is trained to provide two output vectors, each of a size corresponding to the number of possible conditions/classes for the task. Thus the output vector for the task of detecting cell interference conditions is a vector of a size equal to the number of possible cell interference conditions. Each position in the vector corresponds to a particular cell interference condition, and the value of each element of the vector provides the probability that the input data is consistent with the cell interference condition to which the element position corresponds. Similarly, the output vector for the task of classifying the performance impact of detected interference conditions is a vector of a size equal to the number of possible cell performance impact classes. Each position in the vector corresponds to a particular performance impact class, and the value of each element of the vector provides the probability that the input data is consistent with the performance impact class to which the element position corresponds.

Figure 10:
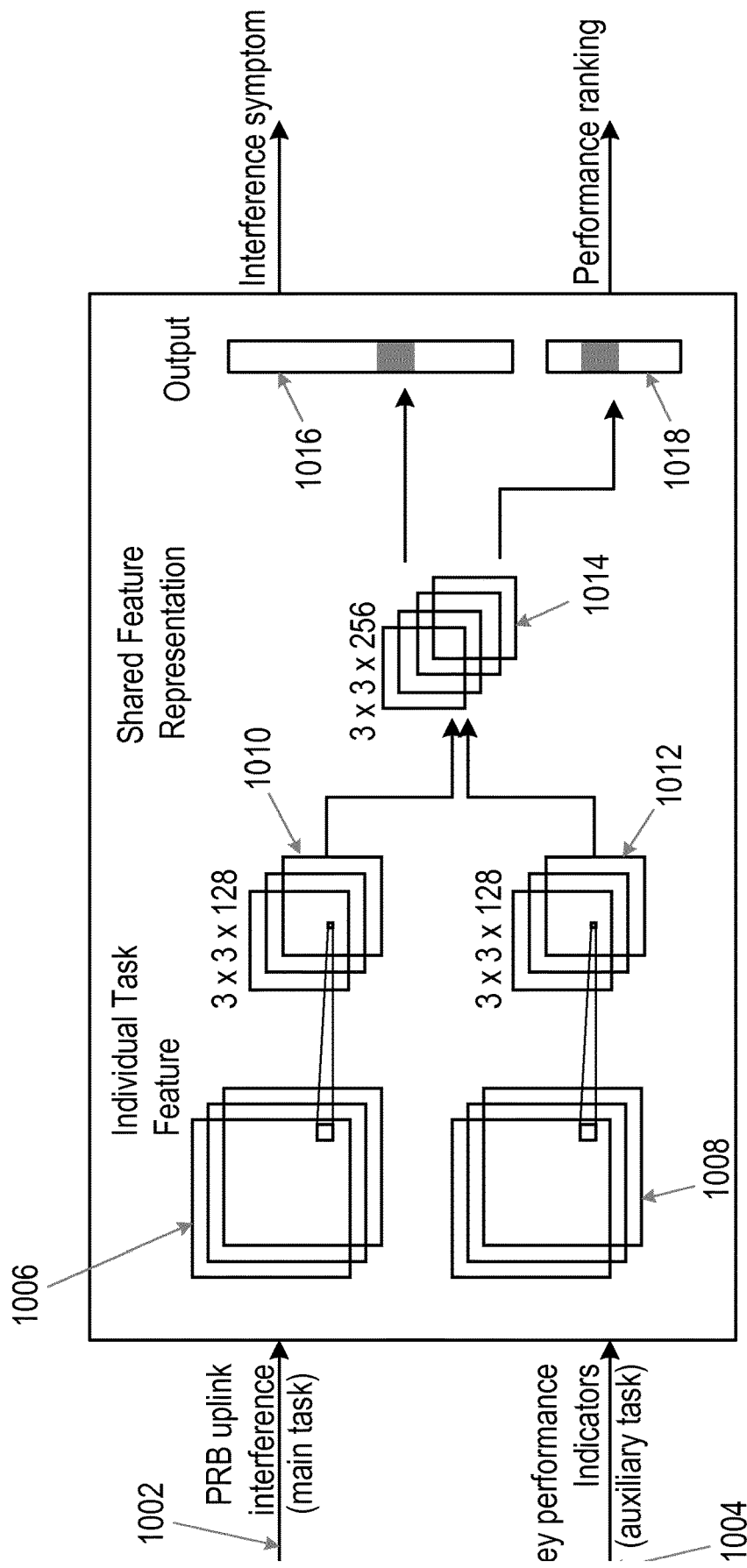
FIG. 10 provides a graphical representation of an implementation of an MTL architecture for carrying out methods according to the present disclosure.

FIG. 10 provides a visual representation of an implementation of an MTL architecture for carrying out methods according to the present disclosure. Referring to FIG. 10, the upper part of the Figure corresponds to the main task of cell interference condition detection, and the lower part of the Figure corresponds to the auxiliary task of performance impact classification. The input data 1002, 1004 is input to the MTL architecture and the MTL algorithm initially learns in parallel feature representations 1006, 1008 for each task. The dimensionality of the learned feature representations may be reduced in a pooling step, resulting in two arrays of feature maps 1010, 1012, one for each task. In FIG. 10, these arrays of feature maps are illustrated as being of dimension 3×3 and depth 128, that is comprising 128 individual feature maps. The feature maps that have been learnt in parallel for the two tasks are then combined by concatenating the arrays to form a single shared feature map array 1014 of dimensions 3×3 and depth 256. This shared feature map array is used to jointly learn shared weights for the model and a shared feature representation, minimising the total loss for the tasks. The result is two output vectors 1016, 1018, each providing a probability that the input data corresponds to any one of the possible cell interference conditions and cell performance impact classes.

Figure 11:
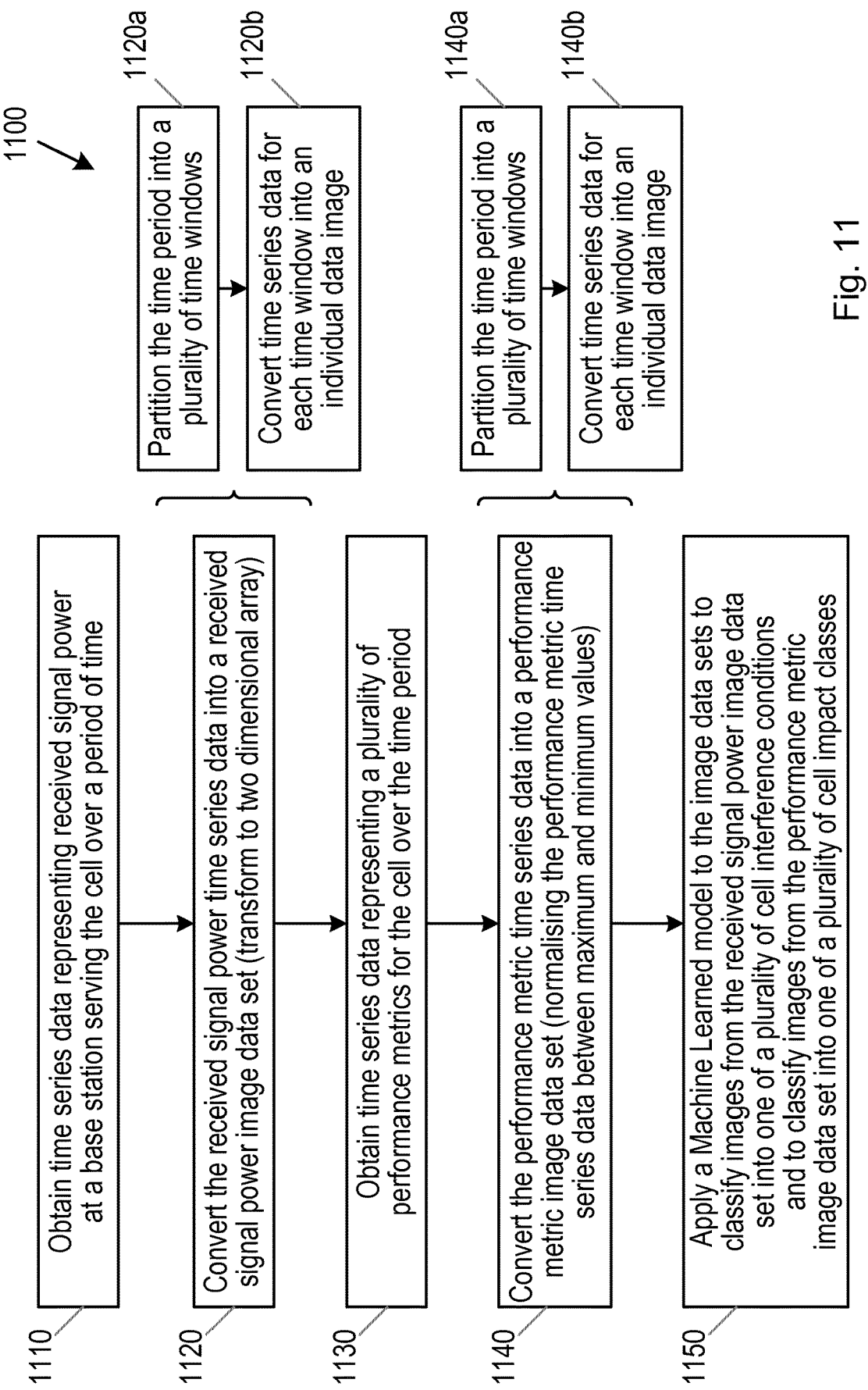
FIG. 11 is a flow chart illustrating process steps in another method according to an example of the present disclosure.

Once trained, the shared model may be deployed to perform the two tasks of detecting cell interference conditions and classifying performance impact of detected conditions. FIG. 11 is a flow chart illustrating process steps in a method 1100 for detecting interference conditions at a cell in a wireless cellular network and classifying the impact of detected interference conditions on performance of the wireless cellular network in the cell. The method may in some examples be carried out in a server comprised within or connected to a core network that is in communication with a cellular radio access network, or in other examples may be carried out by a virtualised application or network function running in the cloud. In further examples, the method may be carried out within a radio access node such as a base station or a virtual function logically connected to the radio access node. Referring to FIG. 11, the method 1100 comprises, in a first step 1110, obtaining data representing received signal power at a base station serving the cell of the over a period of time. As illustrated in step 1110, the data may be time series data. The method 1100 may further comprise the step 1120 of converting the received signal power time series data into a received signal power image data set. This conversion step may comprise partitioning the time period into a plurality of time windows in step 1120a and converting time series data for each time window into an individual data image in step 1120b. The performance of the conversion step 1120 may be carried out substantially as described above with respect to the methods 300, 600.

The method 1100 further comprises the step 1130 of obtaining data representing a plurality of performance metrics for the cell over the time period. As illustrated in step 1130, the data may be time series data. The method 1100 may further comprise the step 1140 of converting the performance metric time series data into a performance metric image data set. The method 1100 may further comprise the step 1140 of converting the performance metric time series data into an image data set. This conversion step may comprise partitioning the time period into a plurality of time windows in step 1140a and converting time series data for each time window into an individual data image in step 1140b. The performance of the conversion step 1140 may be carried out substantially as described above with respect to the methods 300, 600.

In step 1150, the method 1100 comprises applying a Machine Learned model to the obtained data to classify the received signal power data into one of a plurality of cell interference conditions and to classify the performance metric data into one of a plurality of cell impact classes. As discussed above, the Machine Learned model may be a model trained using a method according to examples of the present disclosure, such as the methods 300, 600. As illustrated in step 1150, applying a Machine Learned model to the obtained data to classify the received signal power data into one of a plurality of cell interference conditions and to classify the performance metric data into one of a plurality of cell impact classes may comprises applying the Machine Learned model to the received signal power image data set and to the performance metric image data set to classify images of the received signal power image data set into one of the plurality of cell interference conditions and to classify images of the performance metric image data set into one of the plurality of cell impact classes.

Figure 13:
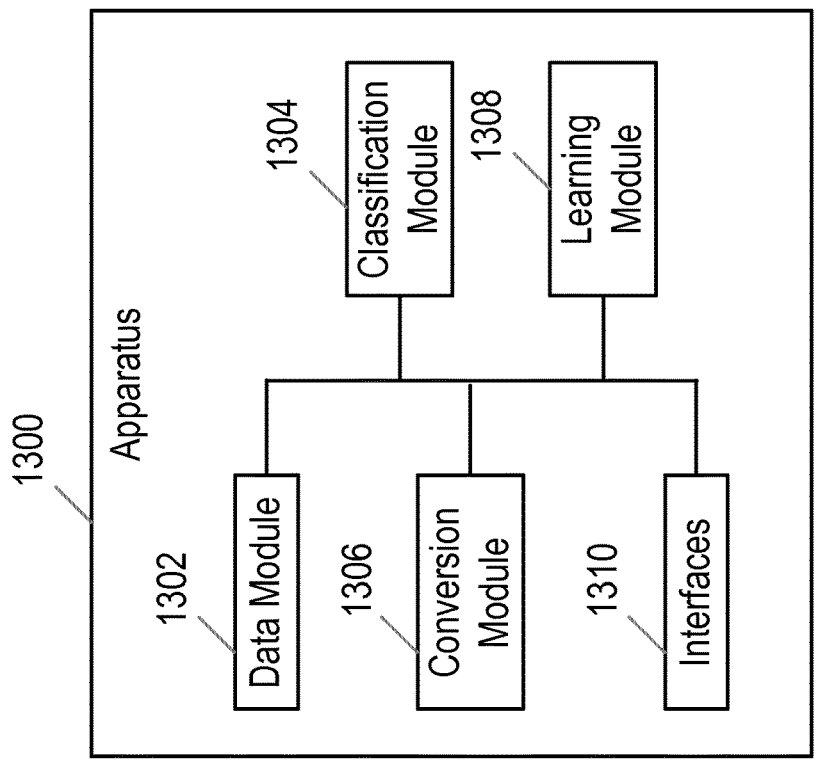
FIGS. 12 and 13 are block diagrams illustrating apparatus according to examples of the present disclosure.
Figure 12:
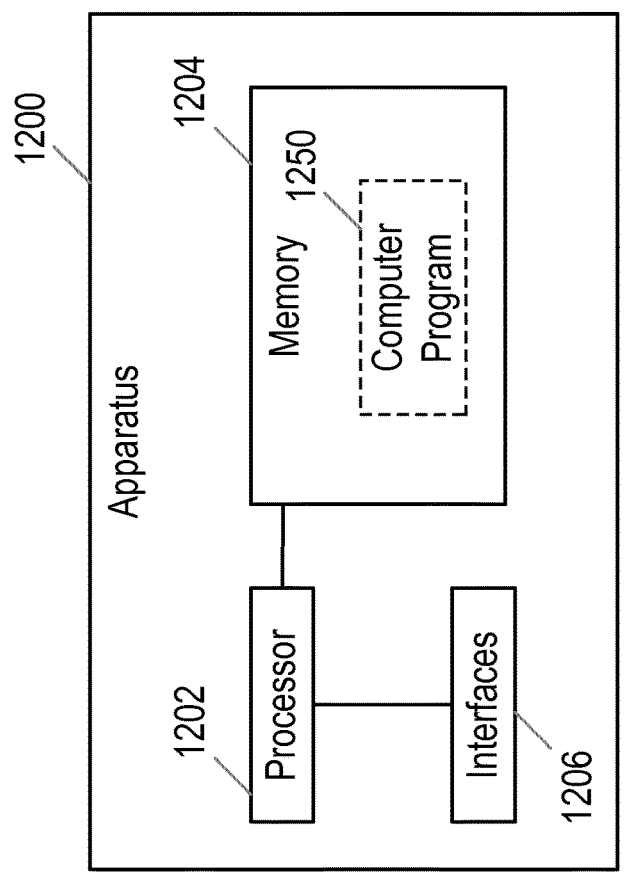

FIGS. 12 and 13 are block diagrams illustrating examples of apparatus 1200, 1300 which may carry out examples of the method 300 and or 600 as discussed above.

FIG. 13 illustrates a first example of apparatus 1200, which may implement some or all of the steps of method 300 and/or 600, for example on receipt of suitable instructions from a computer program 1250. The apparatus may for example be located in a server of or connected to a core network, a base station or other radio access node, or a server in a data center running one or more virtual machines executing the steps of the method 300 and or 600. Referring to FIG. 12, the apparatus 1200 comprises a processor or processing circuitry 1202, a memory 1204 and interfaces 1206. The memory 1204 contains instructions executable by the processor 1202 such that the apparatus 1200 is operative to conduct some or all of the steps of the method 300 and/or 600. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

FIG. 13 illustrates another example of apparatus 1300, which may also be located in a server of or connected to a core network, a base station or other radio access node, or a server in a data center running one or more virtual machines executing the steps of the method 300 and or 600. Referring to FIG. 13, the apparatus 1300 comprises a plurality of functional modules, which may execute the steps of method 300 and/or 600 on receipt of suitable instructions for example from a computer program. The functional modules of the apparatus 1300 may be realised in any appropriate combination of hardware and/or software. The modules may comprise one or more processors and may be integrated to any degree. The apparatus 1300 is for generating and training a model to detect interference conditions at a cell in a wireless cellular network and to classify the impact of detected interference conditions on performance of the wireless cellular network in the cell. Referring to FIG. 13, the apparatus 1300 comprises a data module 1302 for obtaining data representing received signal power at a base station serving a cell over a period of time and for obtaining data representing a plurality of performance metrics for the cell over the time period. The apparatus also comprises a classification module 1304 for obtaining a classification of the received signal power data into one of a plurality of cell interference conditions and for obtaining a classification of the performance metric data into one of a plurality of cell impact classes. The data module 1302 and classification module 1304 are each for obtaining the data and classification for each of a plurality of cells in the wireless cellular network. The apparatus 1300 further comprises a learning module 1308 for applying a Multi-Task Learning, MTL, Machine Learning, ML, algorithm to a training data set comprising the classified received signal power and performance metric data to generate a model for classifying received signal power data into one of the plurality of cell interference conditions and for classifying performance metric data into one of the plurality of cell impact classes. The apparatus 1300 also comprises interfaces 1310.

Figure 15:
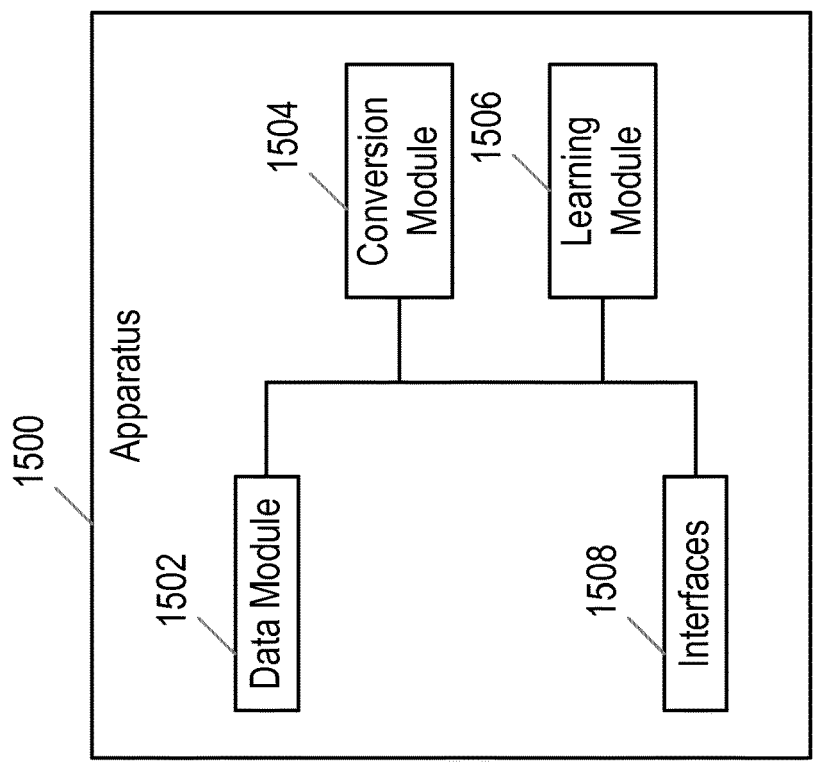
FIGS. 14 and 15 are block diagrams illustrating apparatus according to further examples of the present disclosure.
Figure 14:
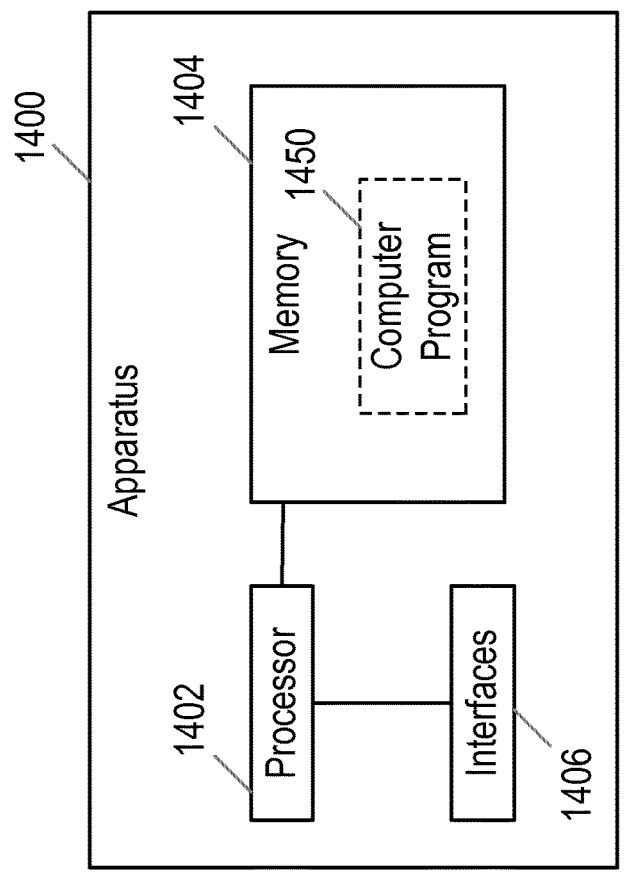

FIGS. 14 and 15 are block diagrams illustrating examples of apparatus 1400, 1500 which may carry out examples of the method 1100 as discussed above.

FIG. 14 illustrates a first example of apparatus 1400, which may implement some or all of the steps of method 1100, for example on receipt of suitable instructions from a computer program 1450. The apparatus may for example be located in a server of or connected to a core network, a base station or other radio access node, or a server in a data center running one or more virtual machines executing the steps of the method 1100. Referring to FIG. 14, the apparatus 1400 comprises a processor or processing circuitry 1402, a memory 1404 and interfaces 1406. The memory 1404 contains instructions executable by the processor 1402 such that the apparatus 1400 is operative to conduct some or all of the steps of the method 1100. The instructions may also include instructions for executing one or more telecommunications and/or data communications protocols. The instructions may be stored in the form of the computer program 1450. In some examples, the processor or processing circuitry 1402 may include one or more microprocessors or microcontrollers, as well as other digital hardware, which may include digital signal processors (DSPs), special-purpose digital logic, etc. The processor or processing circuitry 1402 may be implemented by any type of integrated circuit, such as an Application Specific Integrated Circuit (ASIC), Field Programmable Gate Array (FPGA) etc. The memory 1404 may include one or several types of memory suitable for the processor, such as read-only memory (ROM), random-access memory, cache memory, flash memory devices, optical storage devices, solid state disk, hard disk drive etc.

FIG. 15 illustrates another example of apparatus 1500, which may also be located in a server of or connected to a core network, a base station or other radio access node, or a server in a data center running one or more virtual machines executing some or all of the steps of the method 1100. Referring to FIG. 15, the apparatus 1500 comprises a plurality of functional modules, which may execute some or all of the steps of method 1100 on receipt of suitable instructions for example from a computer program. The functional modules of the apparatus 1500 may be realised in any appropriate combination of hardware and/or software. The modules may comprise one or more processors and may be integrated to any degree. The apparatus 1500 is for detecting interference conditions at a cell in a wireless cellular network and classifying the impact of detected interference conditions on performance of the wireless cellular network in the cell. The apparatus 1500 comprises a data module 1502 for obtaining data representing received signal power at a base station serving the cell over a period of time and for obtaining data representing a plurality of performance metrics for the cell over the time period. The apparatus may also comprise a conversion module 1504 for converting the received signal power data and performance metric data to a received signal power image data set and a performance metric image data set. The apparatus further comprises a learning module 1506 for applying a Machine Learned model to the obtained data to classify the received signal power data into one of a plurality of cell interference conditions and to classify the performance metric data into one of a plurality of cell impact classes. The apparatus 1500 also comprises interfaces 1508.

Figure 16:
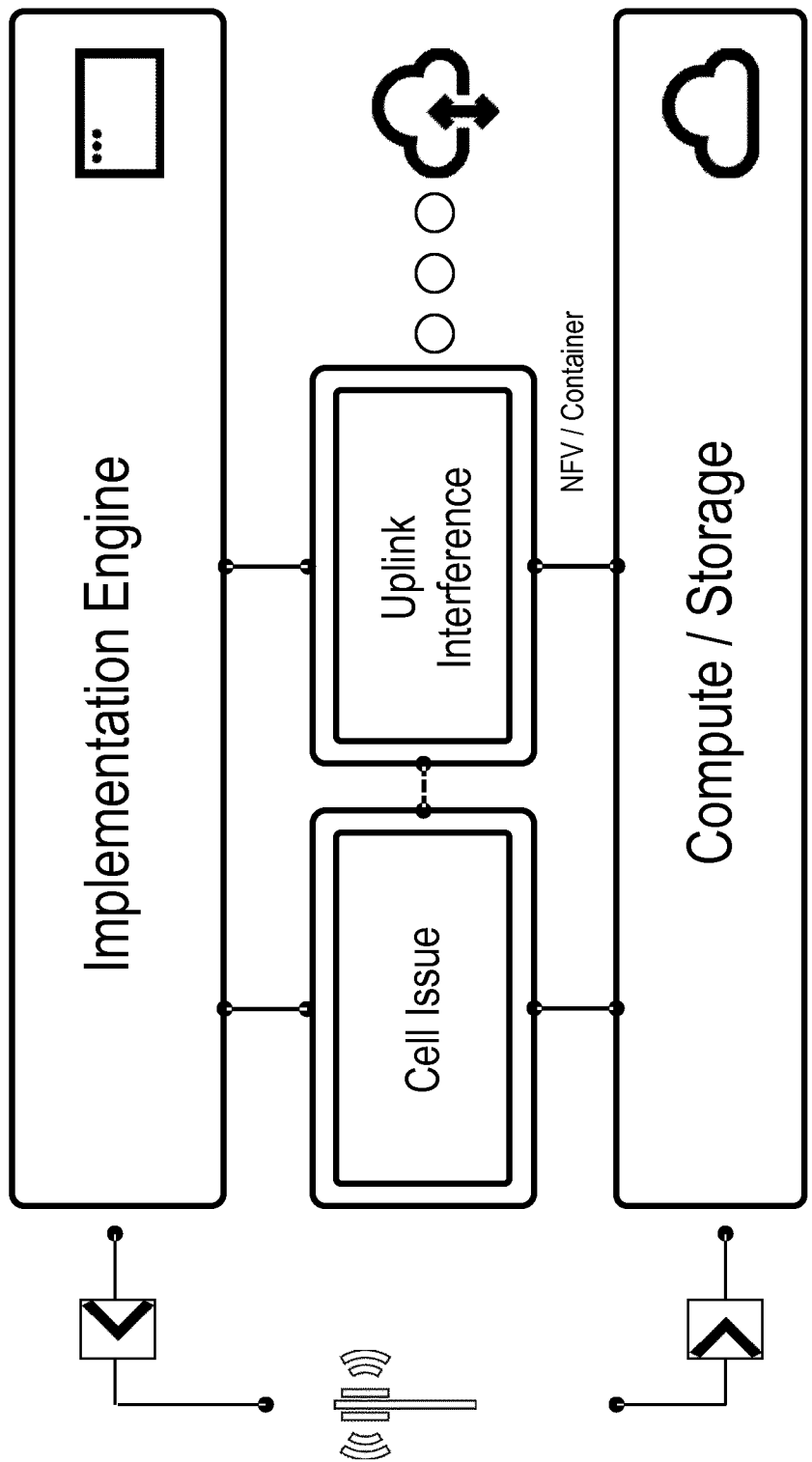
FIG. 16 illustrates an example implementation of aspects of the present disclosure.

FIG. 16 illustrates an example implementation of aspects of the present disclosure, in which the generated model for detection and classification, and a data adaptation module for obtaining and processing the relevant input data, are containerized and deployed in the cloud or any virtualised platform that fulfils the deployment requirements of the container.

Figure 17:
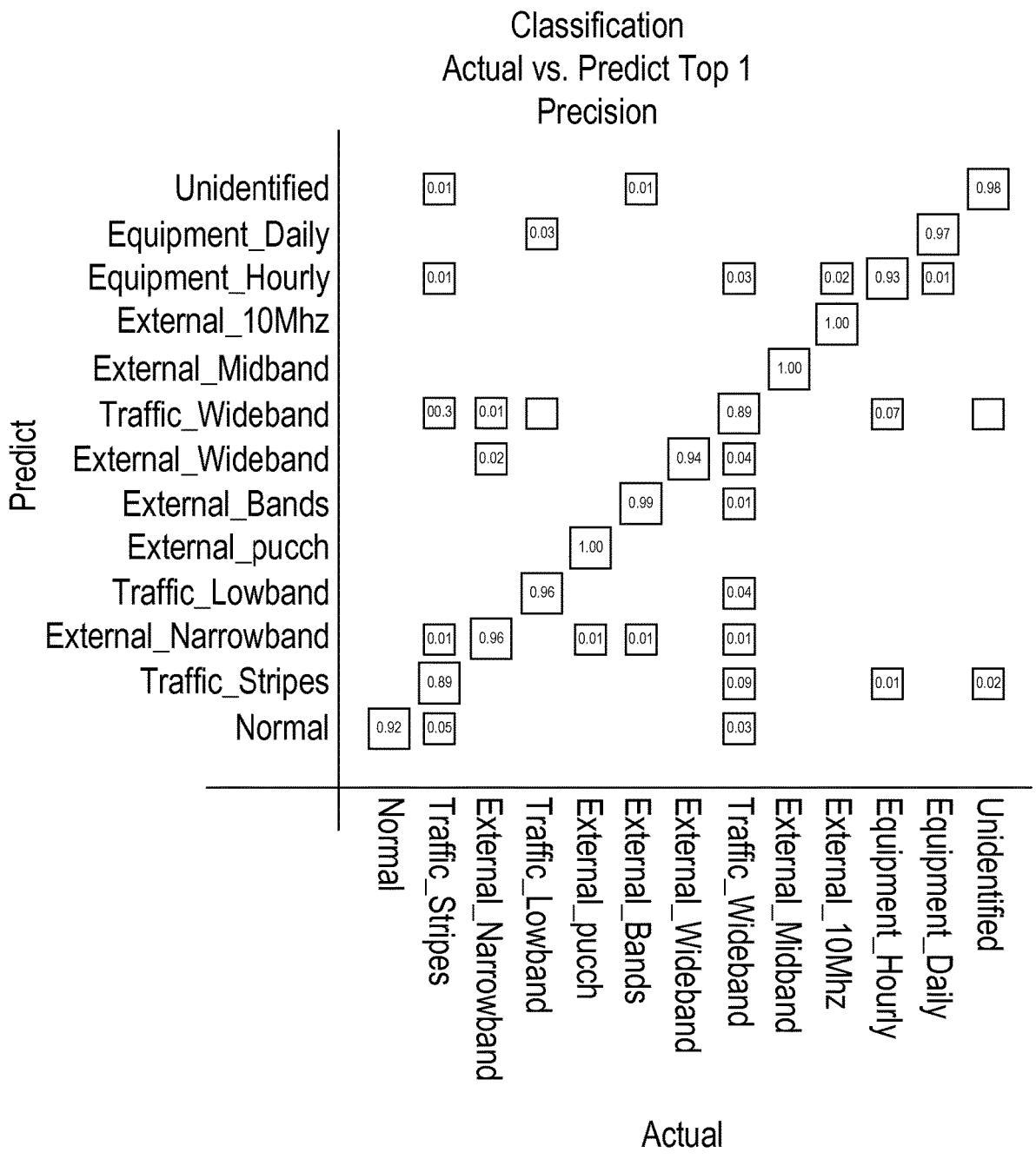
FIG. 17 is a graph illustrating evaluation of a model trained according to methods of the present disclosure.
Figure 18:
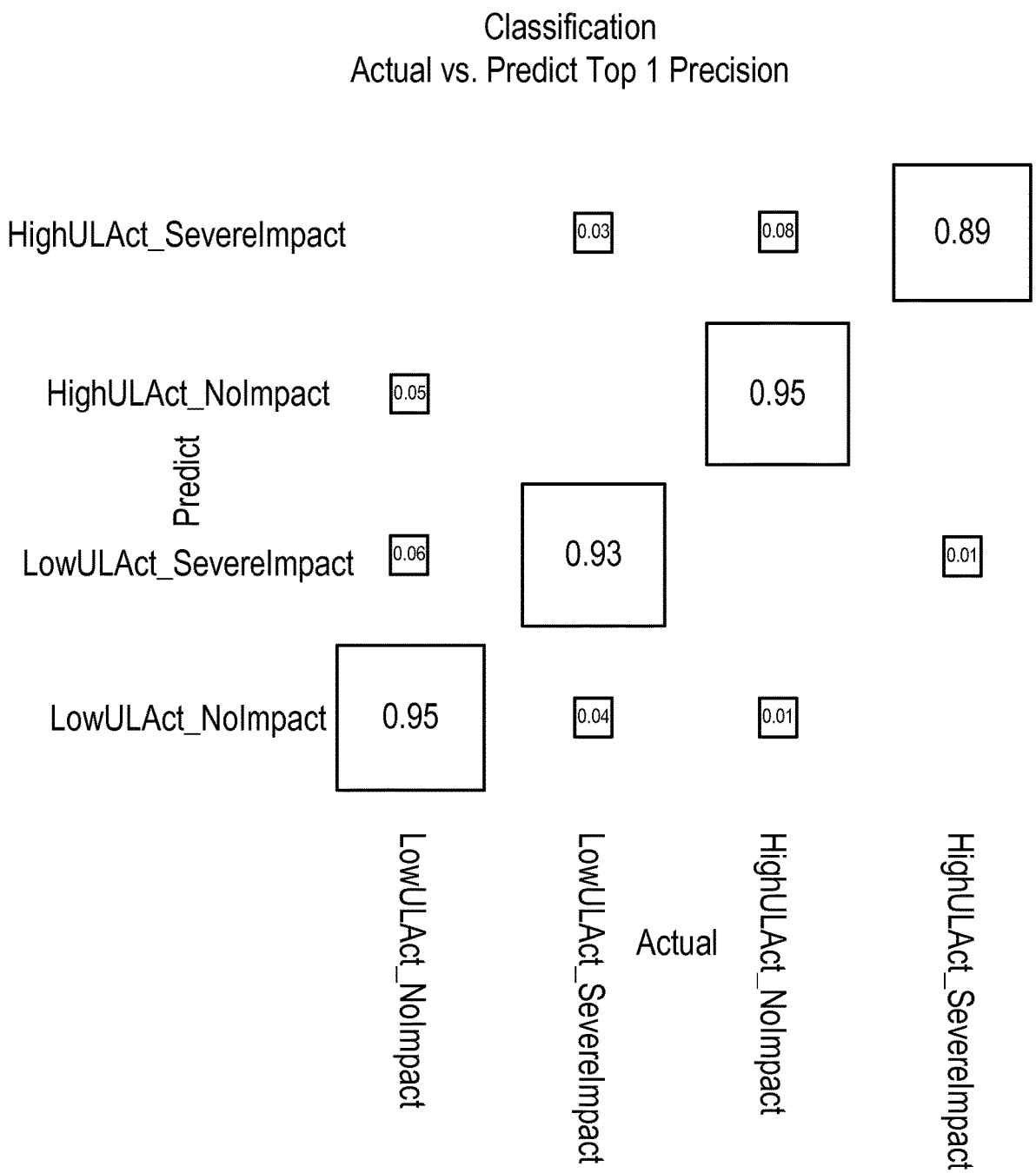
FIG. 18 is another graph illustrating evaluation of the model trained according to methods of the present disclosure.

FIG. 17 is a graph illustrating evaluation of a model trained according to methods of the present disclosure. The graph of FIG. 17 is referred to as a confusion matrix, and illustrates performance of the model for the first task of cell interference detection. each axis of the graph sets out the possible cell interference conditions, and the entries in the graph illustrate the predictions of the model against the actual interference conditions. A perfectly performing model would thus be illustrated by a graph having only entries of 1.00 along the diagonal. FIG. 18 is a similar confusion matric illustrating performance of the model for the second task of classifying cell impact performance. The model performance illustrated in FIGS. 17 and 18 demonstrates an average accuracy exceeding 92%, which represents a considerable improvement on existing classification methods.

Aspects of the present disclosure thus provide a method for generating, training and using a model to detect cell interference conditions and classify the impact of detected conditions on cell performance. This information is of great importance to network operators, enabling the prioritization of network optimisation efforts to maximise network performance, for example by mitigating and/or eliminating uplink interference.

A training method based on Multi-Task Learning (MTL) is proposed to create an uplink interference classifier model that is capable of automatically detecting and classifying various uplink interference patterns and at the same time classifying the impact of the detected conditions on cell performance. Classification performance of an implementation of a model trained according to examples of the present disclosure outperforms existing classification methods. Examples of the present disclosure learn uplink interference pattern detection and classification together with the related task of predicting cell performance impact at the same time using a shared model representation. Two different data sources are proposed: received signal power, for example comprising interference signal per PRB (for uplink interference pattern recognition), and individual serving cell performance metrics (for cell performance impact classification).

Examples of the present disclosure may offer one or more of the following advantages;

Data efficient learning: Examples of the present disclosure discover task relatedness using a limited labelled dataset for the main task of cell interference detection by leveraging domain-specific information contained in the target objective of the related task of performance impact classification.

Improved model performance: The average accuracy for multi-class classification of an example model trained using methods according to the present disclosure exceeds 92% on a test dataset. This accuracy is owed to the generalisation afforded by the latent representation of the target object of the auxiliary task of cell performance impact classification.

Model robustness: Owing to shared feature representation, each individual task is not easily affected by corrupted input data.

Pre-trained model adaptability: Depending upon adaptation requirements a relevant feature variable may be added to the model through additional task learning.

Pre-trained model extendibility: An additional relevant task data source may be merged with the pre-trained model, meaning a new task can be trained with existing tasks and so minimise the size of the annotated dataset required to train for the new task.

Data model maintenance: Maintenance is simplified owing to the use of a single model to perform multiple tasks.

Data model scalability: a model trained according to examples of the present disclosure is highly scalable to perform multiple tasks across an entire operator network.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for generating and training a model to detect interference conditions at a cell in a wireless cellular network and to classify the impact of detected interference conditions on performance of the wireless cellular network in the cell, the method comprising:
for each of a plurality of cells in the wireless cellular network:
obtaining data representing received signal power at a base station serving the cell over a period of time;
obtaining a classification of the received signal power data into one of a plurality of cell interference conditions;
obtaining data representing a plurality of performance metrics for the cell over the time period; and
obtaining a classification of the performance metric data into one of a plurality of cell impact classes;
the method further comprising:
applying a Multi-Task Learning (MTL) Machine Learning (ML) algorithm to a training data set comprising the classified received signal power and performance metric data to generate a model for classifying received signal power data into one of the plurality of cell interference conditions and for classifying performance metric data into one of the plurality of cell impact classes, wherein applying an MTL ML algorithm to a training data set comprising the classified received signal power and performance metric data comprises:
learning in parallel a feature representation for each task from the set of tasks comprising classifying received signal power data into one of the plurality of cell interference conditions and classifying performance metric data into one of the plurality of cell impact classes;
combining the feature representations learned for each of the tasks; and
jointly learning a shared feature representation for both tasks and parameters for the shared model to perform both tasks.

2. The method of claim 1, wherein obtaining data representing received signal power and obtaining data representing a plurality of performance metrics over a time period comprise obtaining time series data representing the received signal power and obtaining time series data representing the plurality of performance metrics; the method further comprising, for each of a plurality of cells in the wireless cellular network:
converting the received signal power time series data into a received signal power image data set; and
converting the performance metric time series data into a performance metric image data set.

3. The method of claim 2, wherein obtaining a classification of the received signal power data into one of a plurality of cell interference conditions comprises obtaining a classification of individual images of the received signal power image data set into one of the plurality of cell interference conditions; and wherein obtaining a classification of the performance metric data into one of a plurality of cell impact classes comprises obtaining a classification of individual images of the performance metric image data set into one of the plurality of cell impact classes.

4. The method of claim 1, wherein applying an MTL ML algorithm to a training data set comprising the classified received signal power and performance metric data comprises applying the MTL ML algorithm to generate a model for classifying received signal power data into one of the plurality of cell interference conditions as a primary task and for classifying performance metric data into one of the plurality of cell impact classes as an auxiliary task.

5. The method of claim 1, wherein combining the feature representations learned for each of the tasks comprises:
concatenating the feature representations learned for each of the tasks.

6. The method of claim 1, wherein jointly learning a shared feature representation for both tasks and parameters for the shared model to perform both tasks comprises optimizing a loss function for the tasks.

7. The method of claim 6, wherein images in the received signal power image data set comprise a first dimension representative of time and a second dimension representative of uplink received power of individual Physical Resource Blocks (PRBs) and wherein each image pixel represents a value of received signal power for a particular PRB at a particular time instant.

8. The method of claim 7, wherein images in the performance metric image data set comprise a first dimension representative of time and a second dimension representative of performance metric, and wherein each image pixel represents a value for a particular performance metric at a particular time instant.

9. The method of claim 8, wherein converting the received signal power time series data and performance metric time series data into received signal power and performance metric image data sets comprises:
   partitioning the time period into a plurality of time windows; and
   converting time series data for each time window into an individual data image.

10. The method of claim 9, wherein converting the performance metric time series data into an image data set comprises normalizing the performance metric time series data between maximum and minimum values.

11. The method of claim 9, wherein converting the received signal power time series data into an image data set comprises transforming the data to a standardized 2 dimensional array.

12. The method of claim 11, wherein obtaining a classification of the received signal power data into one of a plurality of cell interference conditions and obtaining a classification of the performance metric data into one of a plurality of cell impact classes comprise at least one of:
   obtaining a classification performed by a human expert;
   classifying the received signal power data into one of a plurality of cell interference conditions and the performance metric data into one of a plurality of cell impact classes using an ML model.

13. A computer program product comprising a non-transitory computer readable medium storing a computer program comprising instructions which, when executed on at least one processor, cause the at least one processor to carry out a method according to claim 1.

14. A method for detecting interference conditions at a cell in a wireless cellular network and classifying the impact of detected interference conditions on performance of the wireless cellular network in the cell, the method comprising:
   obtaining data representing received signal power at a base station serving the cell of the over a period of time;
   obtaining data representing a plurality of performance metrics for the cell over the time period; and
   applying a Machine Learned model to the obtained data to classify the received signal power data into one of a plurality of cell interference conditions and to classify the performance metric data into one of a plurality of cell impact classes, wherein the Machine Learned model comprises a model trained using a method comprising:
   for each of a plurality of cells in the wireless cellular network:
      obtaining data representing received signal power at a base station serving the cell over a period of time;
      obtaining a classification of the received signal power data into one of a plurality of cell interference conditions;
      obtaining data representing a plurality of performance metrics for the cell over the time period; and
      obtaining a classification of the performance metric data into one of a plurality of cell impact classes;
   the training method further comprising:
   applying a Multi-Task Learning (MTL) Machine Learning (ML) algorithm to a training data set comprising the classified received signal power and performance metric data to generate a model for classifying received signal power data into one of the plurality of cell interference conditions and for classifying performance metric data into one of the plurality of cell impact classes, wherein applying an MTL ML algorithm to a training data set comprising the classified received signal power and performance metric data comprises:
      learning in parallel a feature representation for each task from the set of tasks comprising classifying received signal power data into one of the plurality of cell interference conditions and classifying performance metric data into one of the plurality of cell impact classes;
      combining the feature representations learned for each of the tasks; and
      jointly learning a shared feature representation for both tasks and parameters for the shared model to perform both tasks.

15. Apparatus for generating and training a model to detect interference conditions at a cell in a wireless cellular network and to classify the impact of detected interference conditions on performance of the wireless cellular network in the cell, the apparatus comprising a processor and a memory, the memory containing instructions executable by the processor such that the apparatus is operable to:
   for each of a plurality of cells in the wireless cellular network:
      obtain data representing received signal power at a base station serving the cell over a period of time;
      obtain a classification of the received signal power data into one of a plurality of cell interference conditions;
      obtain data representing a plurality of performance metrics for the cell over the time period; and
      obtain a classification of the performance metric data into one of a plurality of cell impact classes;
   the apparatus further operable to:
   apply a Multi-Task Learning (MTL) Machine Learning (ML) algorithm to a training data set comprising the classified received signal power and performance metric data to generate a model for classifying received signal power data into one of the plurality of cell interference conditions and for classifying performance metric data into one of the plurality of cell impact classes, wherein applying an MTL ML algorithm to a training data set comprising the classified received signal power and performance metric data comprises:
      learning in parallel a feature representation for each task from the set of tasks comprising classifying received signal power data into one of the plurality of cell interference conditions and classifying performance metric data into one of the plurality of cell impact classes;
      combining the feature representations learned for each of the tasks; and
      jointly learning a shared feature representation for both tasks and parameters for the shared model to perform both tasks.

16. Apparatus for generating and training a model to detect interference conditions at a cell in a wireless cellular network and to classify the impact of detected interference conditions on performance of the wireless cellular network in the cell, the apparatus adapted to:

for each of a plurality of cells in the wireless cellular network:
  obtain data representing received signal power at a base station serving the cell over a period of time;
  obtain a classification of the received signal power data into one of a plurality of cell interference conditions;
  obtain data representing a plurality of performance metrics for the cell over the time period; and
  obtain a classification of the performance metric data into one of a plurality of cell impact classes;

the apparatus further operable to:
apply a Multi-Task Learning (MTL) Machine Learning (ML) algorithm to a training data set comprising the classified received signal power and performance metric data to generate a model for classifying received signal power data into one of the plurality of cell interference conditions and for classifying performance metric data into one of the plurality of cell impact classes, wherein applying an MTL ML algorithm to a training data set comprising the classified received signal power and performance metric data comprises:
  learning in parallel a feature representation for each task from the set of tasks comprising classifying received signal power data into one of the plurality of cell interference conditions and classifying performance metric data into one of the plurality of cell impact classes;
  combining the feature representations learned for each of the tasks; and
  jointly learning a shared feature representation for both tasks and parameters for the shared model to perform both tasks.

* * * * *

UNITED STATES PATENT AND TRADEMARK OFFICE
CERTIFICATE OF CORRECTION

PATENT NO. : 12,170,908 B2
APPLICATION NO. : 17/430207
DATED : December 17, 2024
INVENTOR(S) : Eng et al.

Page 1 of 2

It is certified that error appears in the above-identified patent and that said Letters Patent is hereby corrected as shown below:

On the Title Page

On Page 2, item (56), under "OTHER PUBLICATIONS", in Column 2, Line 1, delete "et al," and insert -- et al., --, therefor.

On Page 2, item (56), under "OTHER PUBLICATIONS", in Column 2, Line 5, delete "et al," and insert -- et al., --, therefor.

In the Drawings

In Fig. 10, Sheet 15 of 21, for Tag "1004", Line 1, delete "ey performance" and insert -- Key performance --, therefor.

In the Specification

In Column 1, Line 34, delete "so" and insert -- to --, therefor.

In Column 4, Line 11, delete "cell of the" and insert -- cell --, therefor.

In Column 6, Line 9, delete "cell of the" and insert -- cell --, therefor.

In Column 6, Line 51, delete "cell of the" and insert -- cell --, therefor.

In Column 7, Lines 10-11, delete "algorithm" and insert -- algorithm; --, therefor.

In Column 16, Line 43, delete "by a" and insert -- be a --, therefor.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,170,908 B2

In Column 16, Lines 47-48, delete " $-\frac{1}{N}\sum_{i=1}^{N}\sum_{c=1}^{C} 1 y_i \in C_c \log P_{model}[y_i \in C_c]$ " and insert -- $-\frac{1}{N}\sum_{i=1}^{N}\sum_{c=1}^{C} 1_{y_i \in C_c} \log P_{model}[y_i \in C_c]$ --, therefor.

In Column 17, Line 50, delete "cell of the" and insert -- cell --, therefor.

In Column 18, Line 30, delete "and or" and insert -- and/or --, therefor.

In Column 18, Line 38, delete "and or" and insert -- and/or --, therefor.

In Column 18, Line 64, delete "and or" and insert -- and/or --, therefor.

In Column 20, Line 37, delete "detection." and insert -- detection, --, therefor.

In Column 21, Line 7, delete "advantages;" and insert -- advantages: --, therefor.

In the Claims

In Column 23, Line 51, in Claim 14, delete "cell of the" and insert -- cell --, therefor.